United States Patent [19]
Jessee

[11] Patent Number: 5,212,629
[45] Date of Patent: May 18, 1993

[54] VOLTAGE AND HARMONIC CONTROL OF A MULTI-POLE INVERTER

[76] Inventor: Ralph D. Jessee, 4411 Zurmehly Rd., Lima, Ohio 45806

[21] Appl. No.: 679,484

[22] Filed: Apr. 2, 1991

[51] Int. Cl.[5] .............................................. H02M 1/12
[52] U.S. Cl. ....................................... 363/42; 363/71; 363/98; 363/132
[58] Field of Search ...................... 363/40, 41, 42, 71, 363/95, 98, 132, 43, 72

[56] References Cited

U.S. PATENT DOCUMENTS

| | | |
|---|---|---|
| 3,324,374 | 6/1967 | Corey . |
| 3,477,010 | 11/1969 | VeNard . |
| 3,614,590 | 10/1971 | Kernick ................................ 363/43 |
| 3,638,094 | 1/1972 | VeNard . |
| 3,648,149 | 3/1972 | Brown et al. . |
| 3,657,633 | 4/1972 | Urish .................................... 363/41 |
| 3,671,846 | 6/1972 | Corey . |
| 3,739,253 | 6/1973 | Humphrey et al. .................. 363/43 |
| 3,781,635 | 12/1973 | Sauer .................................... 363/42 |
| 3,792,286 | 2/1974 | Meier .................................... 363/71 |
| 3,838,331 | 9/1974 | Jensen ................................... 363/72 |
| 3,876,923 | 4/1975 | Humphrey et al. .................. 363/40 |
| 3,979,662 | 9/1976 | Klein ..................................... 363/72 |
| 4,032,832 | 6/1977 | Miller . |
| 4,052,658 | 10/1977 | Hucker . |
| 4,063,144 | 12/1977 | Hucker et al. . |
| 4,153,930 | 5/1979 | Marceau et al. ..................... 363/42 |
| 4,204,264 | 5/1980 | Lipman ................................. 363/40 |
| 4,225,914 | 9/1980 | Hirata et al. ......................... 363/71 |
| 4,357,655 | 11/1982 | Beck ...................................... 363/42 |
| 4,554,501 | 11/1985 | Baker . |
| 4,565,953 | 1/1986 | Espelage . |
| 4,685,043 | 8/1987 | Mehnert . |
| 4,763,059 | 8/1988 | Espelage et al. ..................... 363/41 |
| 4,797,801 | 1/1989 | Furuhashi . |
| 4,847,745 | 7/1989 | Shekhawat . |
| 4,851,723 | 7/1989 | Barnhardt . |
| 4,870,557 | 9/1989 | Stacey .................................. 363/43 |
| 4,931,919 | 6/1990 | Nguyen et al. . |
| 4,937,720 | 6/1990 | Kirchberg . |
| 4,939,441 | 7/1990 | Dhyanchand . |
| 4,956,598 | 9/1990 | Recker et al. . |
| 4,961,130 | 10/1990 | Kirchberg, Jr. . |
| 4,967,334 | 10/1990 | Cook et al. . |
| 4,975,822 | 12/1990 | Lipman ................................. 363/43 |

Primary Examiner—Emanuel T. Voeltz
Assistant Examiner—Jeffrey Sterrett
Attorney, Agent, or Firm—Michael S. Yatsko

[57] ABSTRACT

Apparatus and method for eliminating or reducing to a filterable minimum the relevant harmonic frequencies which otherwise occur in an AC output voltage from a multi-phase static inverter circuit operating from a symmetrically notched source of DC input voltage. The inverter circuit is electronically switched and controlled to provide notched phase voltages with the notch positioning being optimally variably placed in the periodically occurring waveform and with a controlled interval of the notch for controlling the fundamental component independently of the source voltage, while substantially eliminating the 11th and 13th harmonic components of the fundamental output voltage. A harmonic neutralizing transformer circuit includes paired wye, delta, or wye-delta configurations is connected between the inverter circuit and a composite output transformer circuit which couples or connects paired windings of the harmonic neutralizing circuit. This provides an output voltage with cancelled remaining harmonics immediately adjacent to odd number multiples of six times the fundamental frequency.

19 Claims, 7 Drawing Sheets

VOLTAGE AND HARMONIC CONTROL OF A MULTI-POLE INVERTER

BACKGROUND OF THE INVENTION

This invention relates in general to multi-phase inverter systems for AC generators which incorporate static electrical power conversion elements, and more particularly, to multi-phase inverters which provide an AC output voltage which is controllable, independent of a DC input voltage, over a predetermined range.

The invention is particularly applicable to aviation electrical power generation requirements which rely on state of the art electronic features, such as variable speed constant frequency (VSCF) electrical power generators with DC-link control, which are needed aboard present and future military aircraft and for multi-engine commercial aircraft as well. It will be appreciated that the invention has broader applications such as wherever it is needed to provide output power voltage regulation from a static inverter without mandating the controlling of the DC input voltage to the inverter.

Each VSCF generator unit aboard an aircraft includes a multi-phase or three-phase power inverter paired with a propulsion engine in order that each engine can be used to help fulfill the requirement of system redundancy to enhance operational safety. This ensures that the entire electrical power output needs for the aircraft will be met in order to keep the aircraft operational. The VSCF system according to U.S Pat. No. 4,554,501, entitled "Variable Speed Constant Frequency Power System With Auxiliary DC Output" is assigned to the same assignee as the present invention, and it is hereby incorporated by reference into the present application. Another variable speed generator is of the type described in U.S. Pat. No. 4,851,723 entitled "Coolant Pump System for Variable Speed Generators" which also is assigned to the present assignee, and since it also provides a proper environment for the utilization of the presently intended multi-phase inverter system it is likewise incorporated by reference as the second incorporated U.S. Patent.

The three-phase inverters that are used with DC-link frequency conversion for aircraft power generation systems, operating at 400 Hertz and 20 to 50 Kilovolt-amps (KVA), are a subset of static inverters employing semiconductor switching devices which are used for many other applications. These include industrial drive, power conditioning, and the generation of controllable leading or lagging reactive current. In each of these applications, there is a common problem which is difficult to solve. It is the elimination and/or reduction to filterable minimum values of troublesome AC harmonic frequencies which are whole number multiples of the fundamental frequency in hertz. One approach to solving the problem of harmonic neutralization is according to U.S. Pat. No. 4,870,557, entitled "Simplified Quasi-Harmonic Neutralized High Power Inverters" which has been assigned to the same assignee as the present invention. The above assigned patent is hereby incorporated by reference into the present application and will be hereinafter referenced as the third incorporated U.S. patent. This incorporated U.S. patent takes advantage of the double fed 24-pulse inverter comprised of standard groups of inverters such as four six-pulse inverters connected to reduce the complexity of and to half the number of normally required phase shifting transformers with open primary winding neutrals. Furthermore, the secondary winding of at least one of the phase shifting transformers is a delta or a wye winding connected to a neutral line in order to simplify the quasi-harmonic neutralization of the output.

Another timely approach directed towards solving the problem of harmonic neutralization is with the implementation of 12-pulse and 24-pulse inverters assembled from pairs of six-pulse inverters with strategic placement of time-paired notching sets for the reversal of the pole voltage. This approach places each notch with a timing duration within a limited band near to the leading and trailing portions of a half-wave periodicity, and it significantly decreases the original phase displacement of the pole voltages, while offering the simplicity of a single output coupling transformer. This is the subject of pending U.S. Ser. No. 07/612,647, filed Nov. 13, 1990, entitled "Static Inverter", assigned to the same assignee as the present invention, and it is hereby incorporated by reference into the present application and will be hereinafter referenced as the first incorporated U.S. application for patent. The clear benefit to be derived in notching the switching output of the inverters, within this leading and trailing portion timing range, is the affect on some of the most significant harmonics. This viewpoint is for some of the practical applications of the quasi-harmonic neutralized output voltage waveform in which some harmonics are reduced and/or eliminated, i.e. the 5th and 7th harmonics are eliminated and the 11th and 13th are significantly reduced.

One of the principal practical considerations for the realization of static inverter harmonic neutralization of the type described is that the AC output voltage is harmonically neutralized over a predetermined range for which voltage control of the fundamental frequency component is independent of the DC source voltage. Another problem related to the above concerns is that the controlled notching of the multi-pole inverter circuit should reduce the harmonic content of the inverter circuit to a filterable minimum of harmonic voltage components immediately next adjacent to twelve times the fundamental frequency.

The solution should further concern the provision that all remaining harmonic voltage components immediately adjacent to odd number multiples of six times the fundamental frequency are to be cancelled, while a substantial decrease in the 11th and 13th harmonics is accomplished over the entire range of control.

SUMMARY OF THE INVENTION

In accordance with the present invention, there is provided a new and improved multi-pole inverter apparatus and method used for producing a harmonically neutralized AC output voltage at a constant frequency, over a predetermined controllable range, while being controlled independently of a DC source voltage.

In accordance with another aspect of the invention, the multi-pole inverter is a six-pole, three-phase inverter system which is adapted to provide switched or notched output voltages with the notches becoming optimized in their variable placement with respect to preselected phase positions and variable pulse width or duration, in order to reduce the harmonic content of the output voltage of the inverter circuit to a filterable minimum of harmonic voltage components of a frequency immediately next adjacent in whole number multiples to twelve times the fundamental frequency, which is voltage controlled by pole switching, while odd number multiples next adjacent to components six times the fundamental frequency are cancelled.

In accordance with the invention, an inverter circuit apparatus of the general type described is provided wherein a pair of six-pulse bridge inverter circuits are used to provide separate sets of constantly phase displaced output voltages, each of which is also being phase rotated or displaced 120° in a uniform intra-transformer constant phase displacement. Each pole output voltage is phase displaced with respect to the output voltages of the individual phases of the respective bridge inverter circuits. At least one pair of neutralizing transformers receives the sets of output voltages from the inverter circuits across the primary windings which are connected in either a wye with a delta paired configuration, or a wye with another wye paired configuration, or alternatively in a delta with another delta paired configuration. Either of the later two types of paired winding configurations may be of the type in which transformer interphase windings are connected into use, as in the last instance mentioned for the delta paired configuration which results in that type of transformer arrangement becoming what is technically referred to as a truncated delta configuration.

Further in accordance with the invention an output circuit, with terminals at which the harmonically neutralized fundamental output voltages are measured, is derived from a composite transformer circuit which combines additive transformer windings for each phase. The additive windings are connected or coupled, depending upon the particular paired transformer configuration and depending whether or not the interphase transformer windings are used in a rotated wye or truncated delta type of configuration. The output circuit constitutes either a transformer coupled closed-wye secondary composite circuit or includes an interphase transformer with multiple interphase windings connected to the primary windings of the paired neutralizing transformers through an additional interphase transformer being connected between respective closed-wye neutral connections thereof. In the paired delta configuration of the type using a truncated delta transformer, formed through the use of interphase winding pairs, the output circuit includes serial opposing sense pairs of associated secondary windings in series with each other, while each respective opposing secondary winding is coupled to a similarly sensed respective phase primary winding of the associated neutralizing transformer.

Also in accordance with the invention, the six-pulse circuits are adapted to be switchably controlled by strategically notching or reducing the output pole voltage therefrom within the range for a centrally zoned positioned half-wave pair of time controlled interval notches. The strategic notching is set to controllably occur once during each one-quarter cycle for each pole voltage between 35° and 85°, but optimally at about the mid-60°, as measured from a periodically occurring distinct polarity voltage level. The notches are symmetrically centered on the optimized phase position about which the notching time-phase interval is initiated in advance of and terminated in like time thereafter. A notch interval duration is set within a range from about 2° to beyond 20°, but optimally is set at about 10° within the respective quarter-cycle periodicity. Therefore, the notches cause the 11th and 13th harmonics to reduce substantially to zero and the 23rd and 25th harmonics are substantially reduced towards zero.

BRIEF DESCRIPTION OF THE DRAWINGS

The invention may be better understood, and further advantages and uses thereof more readily apparent, when considered in view of the following detailed description of exemplary embodiments taken with the accompanying drawings in which.

DETAILED DESCRIPTION OF THE PREFERRED EMBODIMENTS

This invention is a new and improved multi-pole inverter apparatus and a method of operating an inverter for producing a harmonically neutralized AC output voltage at a relatively constant frequency while being controlled over a predetermined range of operation. An aircraft generator of the variable speed constant frequency (VSCF) type is preferred over constant speed drive generators (CSD) for generating AC power for multi-or three-phase power with a frequency of 400 Hz because of improved power to weight ratios and greater reliability. This enhancement is similarly applicable to requirements for both military and commercial operations which require the provisions of AC output voltages controlled independently of a DC voltage source.

The new and improved inverter system and method are described by illustrating only those parts of an inverter system pertinent to the understanding of the invention, and the supplemental portions of a generator system have been incorporated by reference to issued U.S. Patents as assigned to the same assignee as the present application. The principal requirements for an inverter of the type useful with VSCF airborne power generation systems are established in order to achieve output voltage control, despite variations in the level of DC input voltage in a least weight configuration by minimizing the number of parts required. Another requirement which is fulfilled with this control by the output/input voltage ratio while cancelling all harmonics of the fundamental output voltage circuit except for the harmonic voltage components with a frequency immediately next adjacent to a whole number multiple of twelve times the fundamental frequency, and these remaining harmonics are reduced to a filterable minimum amount. The harmonic frequency components appearing at the AC filter input are therefore of the same relative magnitude as those of the waveform generated by the switching poles, while the AC voltage output is controlled over an exemplary range of 1:3 of the maximum available voltage as well as maintaining a high quality voltage waveform.

Figure 1:
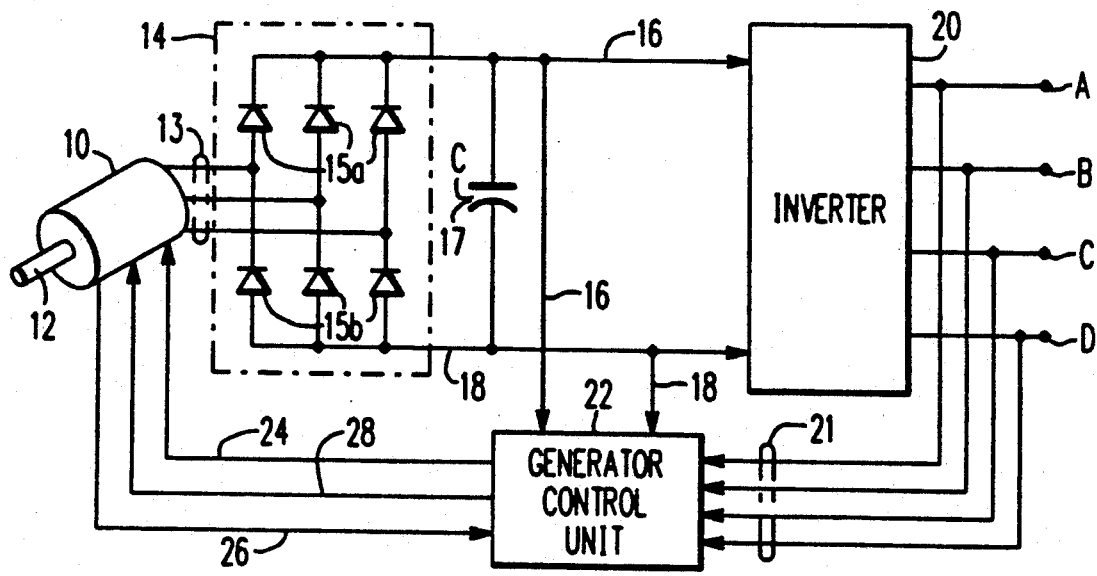
FIG. 1 is a schematic block diagram of a prior art variable speed constant frequency ("VSCF") generator system of a DC-link type which is shaft coupled through the output shaft of a propulsion engine.

An example of a variable speed constant frequency (VSCF) power system is shown in FIG. 1, an inverter therein is and designated by numeral 20 which produces a three-phase output which is maintained at a constant 400 Hz for the power usage requirements of an aircraft. The reproduction of this figure as prior art is known from a like-numbered figure in the U.S. Pat. No. 4,851,723 as incorporated by reference herein as the second U.S. Patent as earlier stated. This generator system configuration incorporates coolant pump control provided by a DC-link pair of conductors 16, 18 in which a DC voltage is produced by rectifying a three-phase AC output voltage 13 with a bridge rectifier 14. This occurs after three-phase production by a variable speed generator 10 which is rotated through its input shaft 12 which is coupled to a propulsion engine in order to provide the inverter 20 with the required input voltage. The inverter 20 converts 270 volts DC to a constant 400 Hz output three-phase voltage in order to supply the power usage AC voltage requirements on output lines A, B, C while feeding back the output voltage and neutral line D on lines 21 to the control sensing unit 22. A pair of DC inputs 16, 18 are also connected from the DC-link voltage with filtering capacitor 17 connected from a rectifier assembly 14 constituted by a pair of poled diode banks 15$a$, 15$b$.

The speed of the generator 10 is sensed on line 26 as an input to the control unit 22 which outputs an exciter field adjustment on line 24 and produces a pressure pump displacement signal on line 28. This arrangement regulates the pump rotor speed of the generator 10 since the pump displacement control signal varies with the exciter field current on line 24 and/or the generator speed signal on line 26. In this multi-phase voltage control and power system environment it is crucial to eliminate harmonic distortion in the constant frequency 400 Hz output maintained at an exemplary 115 volts AC or a voltage scaled by transformer action to the most appropriate regulated voltage. The output shaft variation speed of a propulsion engine operates throughout the spectrum of idle-to-cruise speeds for a 20 to 50 kVa, and the generator operating speed range is considered normal in the range of 2,000 to 28,000 revolutions per minute (rpm).

While the DC link voltage produced from the AC generator output voltage may vary, it is the purpose of the present invention to be substituted for the inverter 20 in FIG. 1 to which further attention is subsequently directed, as will be deduced from the voltage waveform analysis which is next represented.

Figure 2:
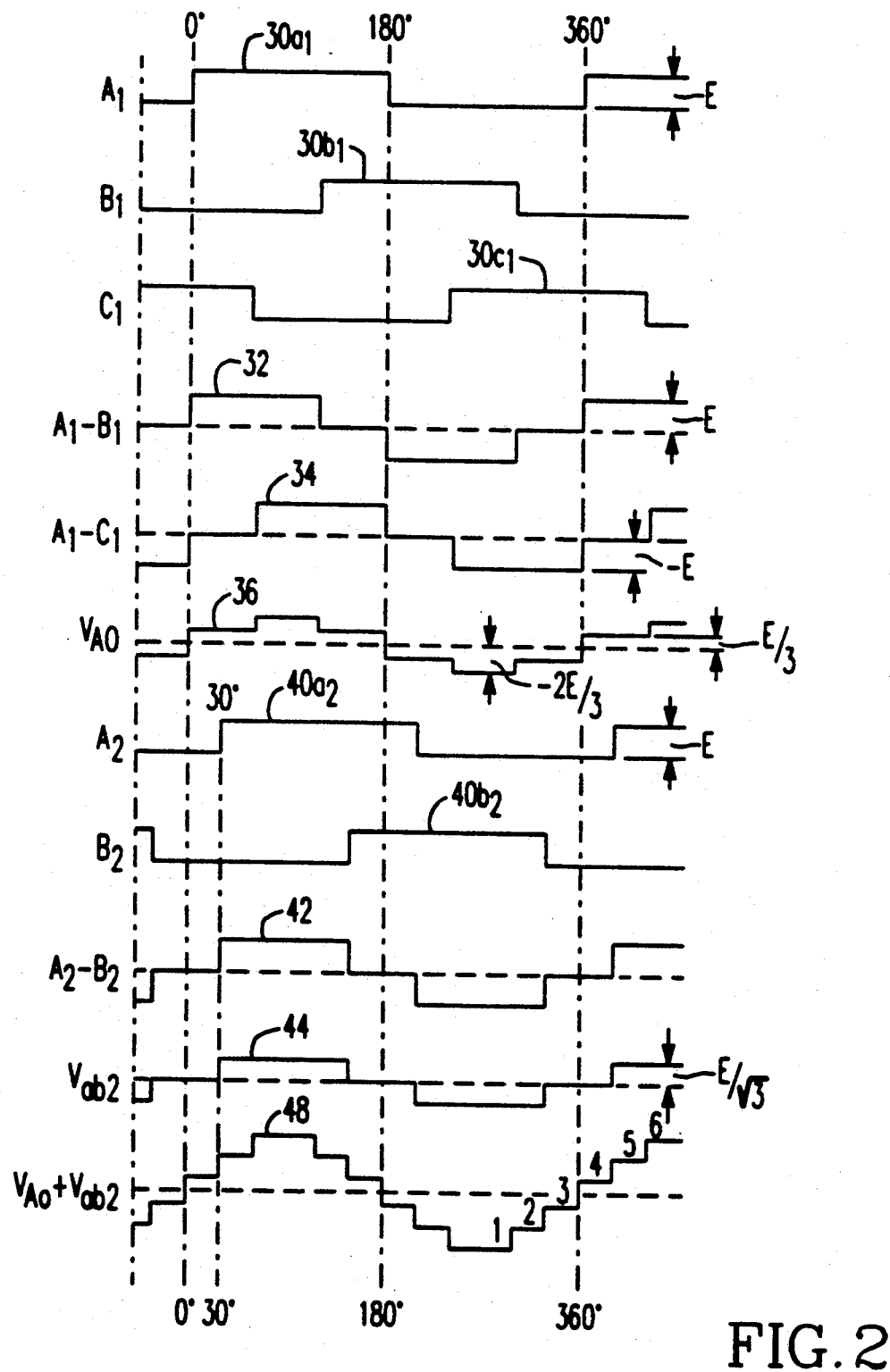
FIG. 2 is a set of phase voltage waveforms shown for a three-phase double pair inverter output transformed into a six-step staircase output waveform by transformer circuit pair configurations, according to the invention.

In FIG. 2 a set of phase voltage waveforms $A_1$, $B_1$, $C_1$ which are mutually phase displaced with respect to each other by 120° phase displacement are shown as rectangular voltage waveforms $30a_1$, $30b_1$, $30c_1$ each of which may take either the high value of E volts or the other value which may be 0 volts or some other values for both with respect to an arbitrary reference. This is, for purposes of analysis, other than a neutral reference during a regular periodic cycle of 360° and alternately changing value for each respective half-period of 180°. A second set of phase voltage waveforms $A_2$, $B_2$, and $C_2$ (not shown) are phased at 120° with respect to each other and each respective waveform likewise has a value of either E volts or 0 volts with respect to an arbitrary reference rather than a neutral reference for purposes of analysis. Furthermore, waveform $A_2$ is represented by E volts where designated $40a_2$, and it is phase delayed 30° with respect to the same portion on phase voltage waveform $A_1$ as designated $30a_1$. Likewise, the phase voltage waveform $B_2$ has the value of E where it is designated $40b_2$, and it has been phase delayed 120° relative to phase voltage waveform $A_2$ combined with another phase delay of 30° as compared with the phase voltage waveform $B_1$ where it has the value of E as designated $30b_1$.

The relationships thus far described for the phase voltage waveforms mentioned are for purposes of introducing the symbolic reference notation which will be used throughout the specification in order to derive intermediate waveforms which combine to provide a resultant or composite inverter output waveform. Prior to filtering this waveform is represented generically as the last waveform $V_{Ao}+V_{ab2}$ which is, however, not totally representative of the complex notched six-step staircase output waveform according to the present invention. The reduction of complexity for purposes of simple analysis will be more clearly appreciated with anticipation that each of the set of phase voltage waveforms $A_1$, $B_1$, $C_1$ and $A_2$, $B_2$ assumes the form of a central zone, quarter-phase notched rectangular pole voltage waveform of five-pulse designation shown in FIG. 3. This waveform will be optimally characterized having predefined positional notches defining a number of commonly polarized phase intervals as formed by the notches positioned in a complete phase periodic cycle.

Further referring to the waveforms of FIG. 2, it is seen by definition that the difference voltages $V_{Ao}-V_{Bo}=V_A-V_B$ define the voltage loop equations written for a closed-wye input transformer with a 1:1 secondary transformation to a wye output phase voltage $V_{Ao}$ the equation.

$$V_{Ao}=V_A-V_B+V_{Bo} \qquad (1)$$

This relates the output voltage transformed from terms of the input difference in phase voltages $V_A-V_B$ with the 0 addition of the output phase voltage $V_{Bo}$, defined as the output phase voltage across the wye winding leg which receives the phase voltage $V_B$ which is displaced 120° in the closed-wye transformer. A second equation $$V_{Ao}=V_A-V_C+V_{Co} \qquad (2)$$

may similarly be written which relates the output phase voltage $V_{Ao}$ around the voltage loop expressing the difference between the input phase voltage $V_A-V_C$ plus the third phase output voltage $V_{Co}$. Equations (1) and (2) apply to any closed-wye transformer having a 1:1 primary to secondary turns ratio. This may be better appreciated by anticipating how these expressions are relatable to a circuit schematic for a three-phase inverter system shown in FIG. 4. According to the invention, a closed-wye winding connected transformer 72 has a function which will be better understood after further derivation from the above equations which relate to the remaining voltage waveforms in the set of FIG. 2 for which the first input set of phase difference voltages $A_1-B_1$ may be expressed in terms of the input phase voltage $V_A$, $V_B$, $V_C$.

A third equation identity for the closed-wye transformer mentioned above is simply stated.

$$V_{Ao}=V_{Ao} \qquad (3)$$

The summation of the above three equations is performed by separately adding all the terms on the left and right side of the equal sign, respectively resulting in the equation.

$$3V_{Ao}=2V_A-V_B-V_C+V_{Ao}+V_{Bo}+V_{Co} \qquad (4)$$

It should be recognized that the summation of the last three terms of the right side of the equation (4) are represented in this nullity equation.

$$V_{Ao}+V_{Bo}+V_{Co}=0 \qquad (5)$$

This is equal to zero because the summation of voltages to the neutral point of a balanced closed-wye transformer is defined by this relationship. The resulting substitution of equation (5) into equation (4) results in the waveform equation.

$$V_{Ao}=\frac{1}{3}(V_A-V_B+V_A-V_C) \qquad (6)$$

This states that the magnitude of the output phase voltage $V_{Ao}$ for a closed-wye transformer is the magnitude of one-third the quantity of the summation of the first input set of phase difference voltages $A_1-B_1$, as designated at the value of E volts portion 32, and the second input set of phase difference voltages $A_1-C_1$ which has the value E in a phase delayed portion 34. The resultant waveform is shown as the step type output phase voltage $V_{Ao}$ which is incremented in step magnitudes of E/3 volts as designated 36. The ascending and descending increments are related to the polarized maxima of $+/-2E/3$ volts which is shown to represent the unfiltered phase voltage $V_{Ao}$. This is a partial representation for one phase of the symmetrical closed-wye transformer designated 73a in FIG. 4 which will be further discussed when matched with a rectangular pole voltage waveform analysis which is given with respect to FIGS. 3 and 4 combined with the present analysis.

Symmetrical inspection of the other two phases in view of the above derivation provides the remaining output phase equations.

$$V_{Bo}=\frac{1}{3}(V_B-V_C+V_B-V_A) \qquad (7)$$

and $$V_{Co}=\frac{1}{3}(V_C-V_A+V_C-V_B) \qquad (8)$$

These equations define the other two-phase output voltage expressions which are similar in form to equation (6).

A similar voltage analysis is rendered for the second set of phase voltage waveforms $A_2$, $B_2$ applied as input phase voltages to a standard delta transformer winding configuration. The turns ratio between a primary winding in the delta connected set is $\sqrt{3}:1$ with respect to a secondary winding voltage output $V_{ab2}$ which is in phase with the primary winding leg. The resultant step output phase voltage $V_{ab2}$ is designated by the magnitude $E/\sqrt{3}$ volts as 44. This is either plus or minus with a neutral portion in between the changes of polarity, and it is a delayed waveform with the phase angle of 30°. It is further seen to necessarily have the same magnitude as the previously derived phase voltage waveform $V_{Ao}$. Moreover, the fundamental components of both the waveforms $V_{Ao}$ and $V_{Ab2}$ are in phase with each other, but the harmonics of these two waveforms are not in phase because the harmonic derivation anticipates a phase shift by a predetermined multiple amount which has the effect of cancelling or partially cancelling relatable harmonic components of each waveform according to their phase number relationships.

Figure 4:
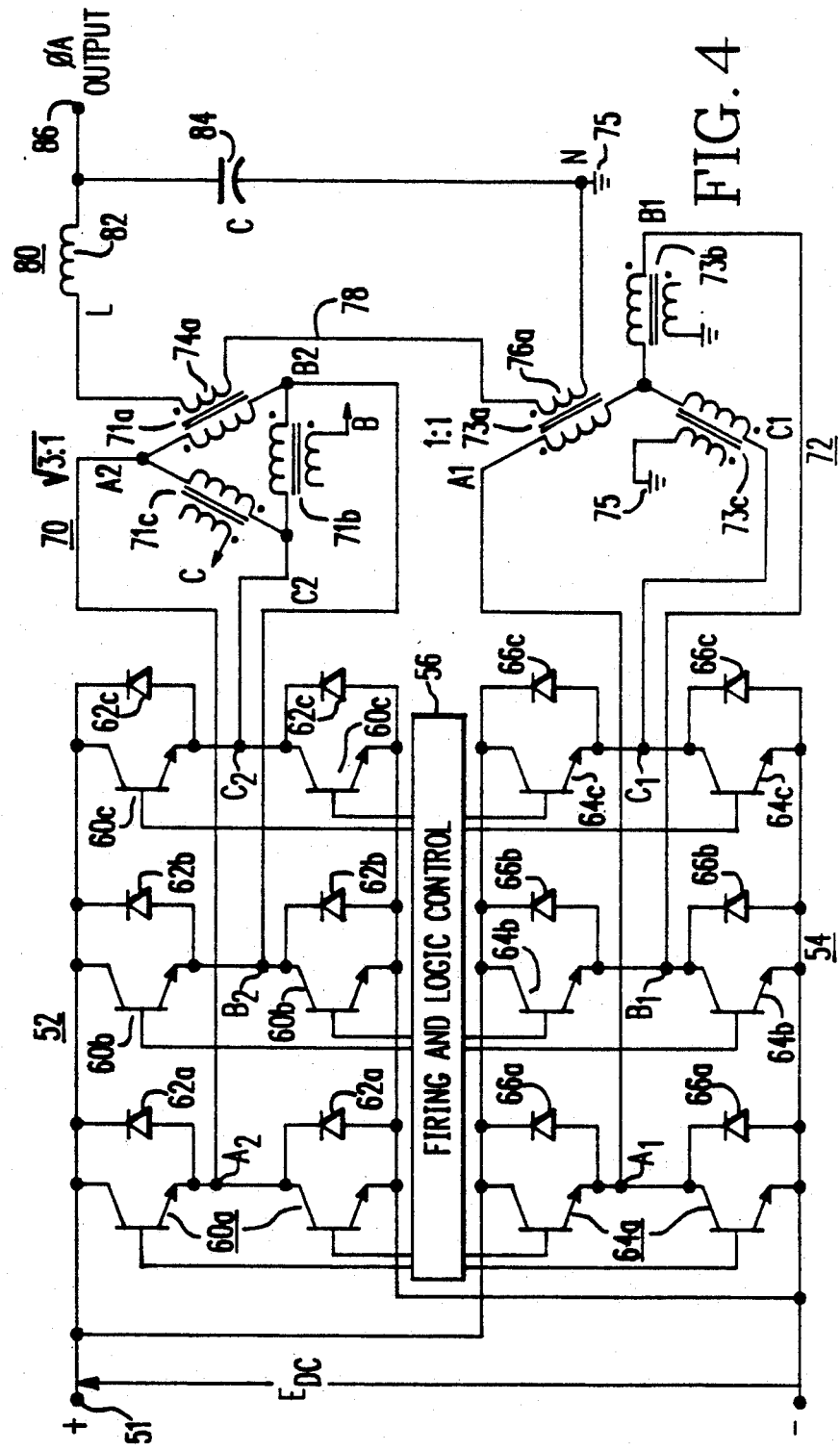
FIG. 4 shows a circuit schematic of a three-phase inverter system with a wye and delta paired configuration of harmonically neutralizing transformers, with an output circuit structured as a closed-wye coupled secondary transformer output, according to the present invention.

There is further anticipation relating the phase voltage waveform $V_{ab2}$, which has just been discussed, with the delta winding transformer shown in FIG. 4. There is a recognition that each delta winding phase secondary output voltage coupled from each delta leg primary winding is relatable to the phase output voltage with its particular magnitude and phase characteristics. These waveforms are additive to those of the phase output voltage $V_{Ao}$, and this is shown as the graphical summation in the last output waveform $V_{Ao}+V_{ab2}$. It is seen to have incremental steps numbered 1 to 6 for the 30° phase segments in the staircase output waveform 48 which is a simplification of the output waveform formed by the transformer circuit pair configurations according to the present invention., Further discussion of same is preceded by a brief discussion of the cancellation of the harmonic amplitudes of certain harmonics which are governed by a harmonic amplitude equation.

$$\Delta A = 2H_n \cos 30n \tag{9}$$

The above equation is for the amplitude of the nth harmonic resulting from the sum of two identical complex waveforms which are phase shifted a constant phase displacement of 60° apart and having an nth harmonic $H_n$. The result is a multiplier $2H_n$ and a cosine function with an argument angle of 30° times n which represents the integer number of the harmonic phase rotation. This phase rotation affects the harmonic amplitude multiplier as well as the sign of the cosine. The equation (9) may take on positive and negative harmonic values, and it is further affected by the harmonic polarity sign of the cosine function which is positive or negative, so that the coefficients are cancellable for certain harmonics as will be further analyzed.

The representation founded on the cosine function expressed in equation (9) is relatable to two or more arbitrary waveforms of the same form, by definition, since if two arbitrary waveforms have the same harmonic amplitudes as other occurring harmonics, then they are identical waveforms. If one of the waveforms is phase shifted with respect to the other waveform, the fundamental component gets phase shifted by an angle $\sigma$ from an arbitrary reference position such as defined by a line representing the abscissa coordinate for a vector with or phasor rotation being in the counterclockwise direction. The phasor addition of a fundamental component of the second waveform is displaced from the first waveform by $2\cdot\sigma°$, and this directs the vector representative of the second waveform fundamental component to close a triangle formed by the vector addition. In other words the vector sum of two equal length fundamental phasors point back to the abscissa with the result that a resultant phasor is represented by the base of an isosceles triangle with two equal sides representing the fundamental components for the waveforms. The equal sides make equal angles with the base phasor side of the triangle which represents the resultant phasor of the addition.

The input set of phase difference voltages 42, previously discussed with respect to FIG. 2, which bears the designation of $A_2-B_2$, results from the sum of two like waveforms displaced 60° apart. The derived resultant step output phase voltage 36 designated $V_{Ao}$ was derived from the sum of two like waveforms which are the same shape as the voltage waveform represented by $A_2-B_2$ and therefore, each one is also displaced 60° apart. This similarity of displacement relationship gives rise to the factor of 30° in the angular argument of 30n. The phase summation equals 60°/2 or 30° in the expression of equation (9). The factor n in this expression is present since phasor rotation is with respect to a reference for the fundamental and is necessarily the foundation for the phasor rotation of all the harmonics of higher order integer numbers n=2, 3, 4, etc. This causes the phasors representing the higher order harmonics to be rotated by their respective harmonic number n in the vector or phasor addition which occurs for all the terms in a trigonometric or sine wave expansion of the waveforms under discussion.

It is the principle of phasor addition that recognizes forcing the elimination of harmonic components of certain structured waveforms, such as the ones represented by $V_{Ao}$ and $V_{ab2}$, and a cancellation of harmonics occurs when a phase reversal with respect to an identical harmonic component is present in one or the other of the waveforms. This is exactly the process used to eliminate harmonics such as the 5th and 7th, the 17th and 19th harmonics, and the 29th and 31st which may be characterized as harmonics immediately adjacent to n times six where n is equal to 1, 3, 5, 7, etc.

A reference table for the first 35 odd harmonic amplitude component values is shown in Table I on page 19 for the waveform $A_2-B_2$ which has been calculated from equation (9), and a similar calculation has resulted in Table II for the harmonic amplitudes of waveform $V_{Ao}$, formed from the sum of amplitudes of the difference waveforms $A_1-B_1$ and $A_1-C_1$.

It is now expedient to turn back to the expression for equation (6) for the resultant step output phase voltage so that the expression may be expanded according to the representation in the next equation.

$$V_{Ao} = \frac{1}{3}(3H_1 \sin\omega t + 3H_5 \sin5\omega t + 3H_7 \sin7\omega t + \tag{10}$$

$$3H_{11} \sin11\omega t + \ldots \text{etc.})$$

This version with sine terms is based upon a harmonic substitution of amplitude components with their characterizing harmonic reference numbers representing the 5th, 7th and 11th harmonics in the expression. Similarly with respect to the resultant step waveform defined in terms of the input phase voltage for the delta transformer as $A_2-B_2$, the turns ratio effective primary to secondary of $\sqrt{3}:1$ results in the output phase voltage expressed as the equation $$V_{ab} = \frac{1}{\sqrt{3}}(A_2 - B_2) = \frac{1}{\sqrt{3}}(\sqrt{3} H_1 \sin\omega t - \tag{11}$$

$$\sqrt{3} H_5 \sin5\omega t - \sqrt{3} H_7 \sin7\omega t + \sqrt{3} H_{11} \sin11\omega t + \ldots \text{etc.}$$

The harmonic amplitude components for the respective first three remaining harmonic numbers are substituted in the sine term expansion of this equation. The remaining operation is to proceed to add some of the above expressions of Equations (10) and (11) in order to provide the composite output voltage waveform represented as $V_{Ao}+V_{ab2}$. Combining the operations of reduction of harmonic amplitude component factors in both expressions so as to eliminate the denominator of 3 in all terms in equation (10) and similarly cancellation from each of the terms of the factor of the $\sqrt{3}$ in equation (11) results in the equation.

$$V_{Ao}^b + V_{ab2} = 2(H_1 \sin\omega t + H_{11} \sin11\omega t + \tag{12}$$

$$H_{13} \sin13\omega t + H_{23} \sin23\omega t + H_{25} \sin25\omega t + \ldots \text{etc.})$$

The above shows that harmonic elimination has occurred for the 5th and 7th harmonic terms which are no longer present, as well as eliminating the 17th, 19th, etc.

harmonics which are cancelled by the negative summing. This has been the result from a 180° phase shift of harmonics in the different waveforms $A_2-B_2$ as related to the difference waveforms $A_1-B_1$ summed with $A_1-C_1$. The remaining harmonics which appear in equation (12) are not eliminated by the phase elimination process of waveform amplitude elimination or harmonic neutralization as described in the above analysis, and these remaining harmonics pose a problem which is solved with regard to the 11th and 13th harmonics and to a lesser extent the 23rd and 25th harmonics which are minimized in the expression according to the invention.

TABLE I

| Harmonic Amplitude Component ($A_2 - B_2$) | n = Harmonic Number |
|---|---|
| $\sqrt{3}\ H_n$ | 1, 13, 25 |
| 0 | 3, 15, 27 |
| $-\sqrt{3}\ H_n$ | 5, 17, 29 |
| $-\sqrt{3}\ H_n$ | 7, 19, 31 |
| 0 | 9, 21, 33 |
| $\sqrt{3}\ H_n$ | 11, 23, 35 etc. |

TABLE II

| Harmonic Amplitude Component $(A_1 - B_1) + (A_1 - C_1)$ | n = Harmonic Number |
|---|---|
| $\sqrt{3}\ (\sqrt{3}\ H_n) = 3\ H_n$ | 1, 13, 25 |
| 0 | 3, 15, 27 |
| $-\sqrt{3}\ (-\sqrt{3}\ H_n) = 3\ H_n$ | 5, 17, 29 |
| $-\sqrt{3}\ (-\sqrt{3}\ H_n) = 3\ H_n$ | 7, 19, 31 |
| 0 | 9, 21, 33 |
| $\sqrt{3}\ (\sqrt{3}\ H_n) = 3\ H_n$ | 11, 23, 35 etc. |

The above analysis introduces the setting for pulse width modulating, more commonly known as high frequency switching or notching of a rectangular waveform or reversing its amplitude from its high value to the low value or zero volts. This was represented for the successively phase delayed waveforms $A_1$, $B_1$, $C_1$ and $A_2$, $B_2$, $C_2$ (the last waveform not shown), each in the manner represented by the waveform of five-pulse designation of FIG. 3, with five-pulse referring to the five-positive portions per cycle. These positive portions are three in number during the first 180° designated 50a, 50b, 50c which are seen to be separated with respect to each other by notching-pulse intervals of $2\beta°$ each. The pole output voltage waveform is reduced to the low value during the latter half wave period of 180° except for the two notching pulses 50d, 50e which are at the same level as the first half period of the rectangular pole voltage. This completes the definition of five-pulse or five positive portions per periodic cycle.

The ultimate consideration for selecting five-pulse parameters is for the purpose of reducing to a filterable minimum the bothersome 11th and 13th harmonics represented in the expression of equation (12) as well as the possible reduction of the 23rd and 25th harmonics. To a lesser extent, the remaining harmonics reduced in magnitude are best characterized as harmonic voltage components of a frequency immediately next adjacent to whole number multiples of twelve times the fundamental frequency. The fundamental voltage component is controlled by pole switching, while odd number multiples of six times the fundamental frequency are cancelled by phase reversal considerations which have been described with respect to the waveforms of FIG. 2. The waveforms are then applied in the three-phase inverter system to a wye and delta paired configuration of harmonically neutralizing transformers 70, 72, as referenced to FIG. 4 in the descriptive analysis of the waveform formation, previously iterated.

Figure 3:
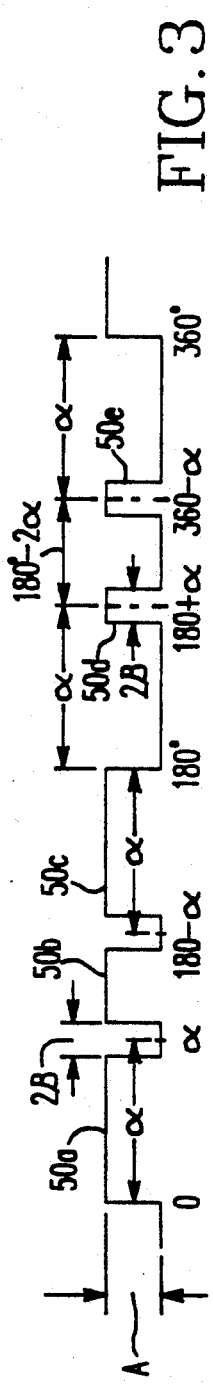
FIG. 3 shows a central zone quarter-phase notched rectangular pole voltage waveform of five-pulse designation, as optimally characterized by the defined number of commonly polarized phase intervals formed by notches positioned in a complete phase periodic cycle.

The definition of notching for the rectangular waveform in FIG. 3 is not complete without defining two aspects of great importance with regard to the phase angle interval $\alpha$ which may be considered a variable, at least for the purpose of selection of the notch-phase interval $\beta$, which is a variable to be used for the purpose of fundamental component voltage control. This insures that the output voltage of the neutralizing transformers 70, 72 does not become overburdened with greater than a minimum filterable harmonic component content of 11th and 13th, 23rd and 25th etc. harmonic amplitude components. The notching interval of $2\beta$ per quarter period cycle is varied over limits of its operating range which is inventively selected to provide minimized harmonic components for the overall operation of a variable fundamental output voltage of the inverter system.

The second quarter period cycle of the periodic output voltage is measured in terms of an identical phase angle interval $\alpha$ with its placement as indicated in FIG. 3. This measurement is symmetrical for the half wave period which means that a second notching interval $2\beta$ is symmetrically centered with respect to the center of positive pulse portion 50b. The notch-phase interval $2\beta$ extends a half-notch width or $\beta$ in either direction from the phase angle interval $\alpha$ which is measured from 180° towards the point designated $180°-\alpha$.

The description of the defined second half-period of the waveform is to be understood from the previous description, and the designation for $\alpha$ and $\beta$ is the same with a notch-pulse interval $2\beta$ for each of the remaining positive pulse portions 50d, 50e. These are respectively positioned in the central zone measured by the phase angle interval $\alpha$ from the 180° and the 360° phase positions so that the notching intervals are centered at $180°+\alpha$ and $360°-\alpha$ as shown.

It is evident that notching of rectangular waveforms has a recognized value in reducing and eliminating harmonic component content in various circuit design configurations. This was recently recognized in the third incorporated U.S. Pat. No. 4,870,557 which introduced the concept of the double fed 24-pulse inverter comprised of standard groups of inverters, such as four six-pulse inverters, which halved the number of normally required phase shifting transformers. Open primary winding neutrals are usefully disclosed, and at least one of the phase shifting transformers is a delta or a wye winding connected to a neutral line for the quasi-harmonic neutralization of the output. A 24-pulse inverter provides a great degree of flexibility and variability which should be counted as inherent values, but there are overriding reasons for reducing the number, such as the minimizing the weight of an inverter unit in an operating airborne environment. Space is also a premium consideration, and there is simply not enough room in an engine nacelle of the jet propulsion type power system to conveniently permit the number of components which are used in a 24-pulse inverter. These multiply several times the weight and space over that which would be introduced by the present invention multi-pole inverter in a three phase system generator. Accordingly, the present invention is disclosed where the number of poles required is only six as compared with the comparable number of twenty-four in the third incorporated U.S. patent. The number of six-pulse inverter bridges which require a firing and logic control, which is centralized or distributed, would be accounted to be at least twice as cumbersome for the third incorporated U.S. patent and contribute to the overall weight of the system. This is seen from a rough comparison of four six-pulse inverter bridges in the multiple configurations of FIGS. 3, 5, 7, 8, and 10 of the third incorporated U.S. patent while only two six-pulse inverter bridges are now needed, as designated 52 and 54 in the preferred embodiment shown in FIG. 4, which will now be described in greater detail.

The structure of the circuit schematic in FIG. 4 shows a three-phase inverter system that takes a DC input voltage E, which is introduced at the input terminals 51, regardless whether the source is from a battery or capacitor or a bridge rectifier output, and converts it to a three-phase output voltage. Linear control of the fundamental AC voltage component output is present at terminal 86, and this takes the form of equation (12) in its idealized state without the harmonics represented in this equation. The harmonics have been reduced to a filterable minimum and are then filtered so as not to be present in the output voltage waveform which is relatively harmonically neutralized or unencumbered thereby. The circuit configuration need only be described briefly as it is likely to be recognized as a permutation of various circuits from the vast portfolio of inverter technology which have been published to date. A uniqueness of structure and function remains since it is not to be used with any other source of pole voltage than the presently described variation, mainly because it is uniquely designed to capitalize on a particular structured waveform. This has been analyzed to be the optimum five-pulse configuration for a voltage controlled output fundamental with harmonic neutralization by pole switching according to the invention.

A first six-pulse bridge inverter circuit 52 is connected to the source of DC input voltage from a terminal 51, and circuit 52 is comprised of transistor pairs 60a, 60b, 60c which are known as Bipolar Insulated Gate Pair (BIGP) transistors which are state of the art devices capable of running at 15,000 Hertz or 15 Khz. Other switching devices such as Gate Turn-Off (GTO) thyristors and other static devices may be preferred in some other applications. Bipolar transistors can be used because switching speed is not as critical a parameter. Switching speed is only one of the many considerations including voltage and power ratings to be met in the choice of pole switches in order to provide notched rectangular waveforms $A_2$, $B_2$, $C_2$ which are of the type shown in FIG. 3. This also requires the zoning of control optimization in terms of the phase notching parameters of $\alpha$ and $\beta$ and the requirements of the system.

The output pole voltages from the first six-pulse inverter circuit 52 are each connected to the respective junctions $A_2$, $B_2$, $C_2$ of a first neutralizing transformer 70 which forms a set of delta connected windings with primary to secondary coupled windings 71a, 71b, 71c. Redundancy is avoided by showing only the secondary coupled output phase winding 74a which is shown to be connected in a circuit for the output phase, and there it is connected in a composite transformer output circuit 80 which will be further described. The pairs of BIGP transistors 60a, 60b, 60c which constitute the first six-pulse bridge circuit have their control terminals each connected to a firing and logic control circuit 56. This is a circuit structure adapted to the task of causing the bridge inverter circuit 52 to output controlled rectangular pole voltages which are precisely notched according to the requirements of the waveform of FIG. 3, so as to establish phase angle interval control for $\alpha$ and notch-phase interval control for $\beta$ notches.

The circuit 52 operates in either a setting-up operation or for the optimum circuit control running mode operation as has further been described and is to be understood from pole voltage waveforms of the type shown in FIG. 3. Each of the BIGP transistors 60a, 60b, 60c are shunted by freewheeling diodes each of which is phase designated 62a, 62b, 62c. Each of these freewheeling diodes is used for the purpose of providing a reverse shunting path around the associated transistors which collectively constitute the notched waveform generator transistors. The first three poles $A_2$, $B_2$, $C_2$ are thus generated by the three-phase inverter circuit for the delta transformer 70 neutralizing affect.

A second six-pulse bridge inverter circuit 54 is almost identically arranged and equipped with respectively connected pole arranged pairs 64a, 64b, 64c of switching transistors of the BIGP type or similarly replaceable with GTOs or other preferred static switching devices. Each switching device is connected in parallel circuit with respective freewheeling diode paths 66a, 66b, 66c being established for the purpose of reverse shunting paths around each transistor. This path provides that circulating switching currents do not encumber the operation of providing the notched pole voltage outputs at terminals $A_1$, $B_1$, $C_1$. These phase terminals $A_1$, $B_1$, $C_1$ are respectively connected to the closed-wye connected windings of a second neutralizing transformer 72. The second neutralizing transformer 72 is comprised of phase winding pairs of coupled primary to secondary windings 73a, 73b, 73c, and one of the transformer coupled secondary phase windings 76a is connected in circuit with line 78 to similarly phased transformer coupled secondary phase winding 74a for the first neutralizing delta winding transformer 71a. The phase coupled delta leg transformer 71a with a series connection is connected to a neutral point 75, and an inductor filter component 82 is connected in series therewith across a capacitor filter component 84 which is connected between the output terminal 86 and the neutral point 75 for the output phase A of the three-phase system. The output phases for the wye and delta paired transformer phases B and C are similarly connected phase by phase in a series additive composite output transformer arrangement.

The selection of the optimum phase angle interval $\alpha$ and notch-phase interval $\beta$ were empirically derived by mathematically simulating for a rectangular notched five-pulse waveform the most appropriate zones of pole operation to minimize the 11th and 13th harmonics.

This provides the opportunity to filter the harmonic amplitude components according to standard criterion requirements which are known for aircraft generator VSCF type of systems. This optimization is described with reference to FIG. 5 which shows a value fixed for $\beta = 4°$ while $\alpha$ is allowed to vary between 65° and 70° to show the polarity reversal of the component amplitude for the 11th and 13th harmonics which vary in a roughly linear fashion from a magnitude of normalized units 0.1 A to −0.1 A. These components are shown to cross or reach a minimum value at approximately $\alpha = 67.5°$ which is roughly the central portion for the harmonic spectrum illustrated. This defines a zone which has been arrived at through a heuristic sleuthing method of derivation with verification and expansion found by computer simulation analysis.

The notch-phase interval $\beta$ has been selected as the control variable for the purpose of controlling the fundamental sinusoidal output voltage of the three-phase inverter, and the apparent value of $\beta = 4°$ is a typical value that was selected within the normal control range so that a variable notch width for the rectangular pole voltage waveform in FIG. 3 is established between $2\beta = 0°$ to 8°, but 8° is not to be considered a maximum or limiting value for $2\beta$ which can easily be extended to 20° or more. It has been discovered that a working range of $\beta$ or notch width $2\beta$ that is used for controlling the fundamental voltage component is actually optimized for some relevant purposes of linearity of control when the 11th and 13th harmonic components go virtually to zero. This happens when $\beta$ is very nearly $\beta = 3.5°$ which is true if $\alpha$ is selected to be about $\alpha = 67.6°$. There are, however, other zones of values for $\alpha$ which, when carefully selected for rectangular pole voltage waveforms according to the invention, will also establish manageable but less favorably suited operating control of fundamental component voltages.

Figure 11:
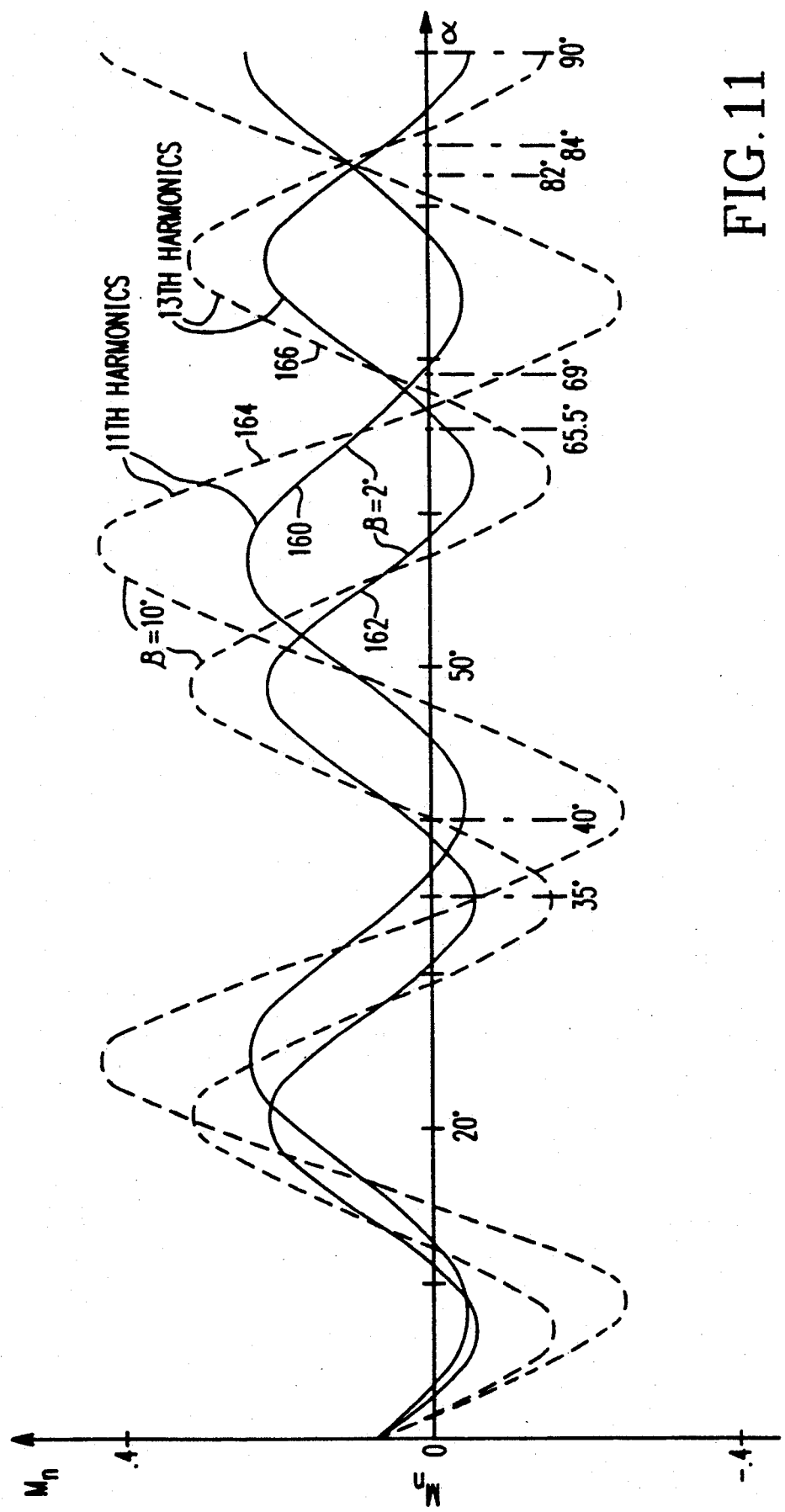
FIG. 11 shows a graph of the relative magnitudes of the 11th and 13th harmonic components as a function of phase position $\alpha$ for two magnitudes of notch-phase interval $\beta$, according to the expression derived in terms of a $\sin(n\alpha)\cdot\sin(n\beta)$ function in order to show the optimum cluster of minimized relevant harmonic components which occurs in multi-zones, but optimally in one zone, according to the invention.

The control under the notch-phase interval $\beta$ will be further demonstrated and discussed with respect to FIG. 11, although the operating range for controlling $\beta$ will either be contracted or expanded depending on the particular value zone chosen for $\alpha$. This is considered to be part of the teaching of the present invention which is expanded from the optimum zone, which still is regarded as the most favorable for eliminating the 11th and 13th harmonics down to filterable minimums as mentioned.

Figure 6A:
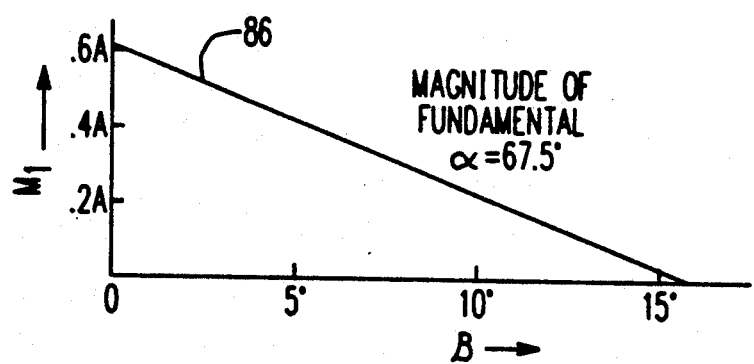
FIG. 6A shows a graph of a nearly linear control function for the fundamental frequency output voltage $M_1$ as a function of a range of notch-phase interval $\beta$ for an optimized value of the phase variable $\alpha$ which minimizes the relevant harmonics selected in FIG. 5.

The graph of FIG. 6A represents the fundamental component magnitude as a function of the notch-phase interval $\beta$ shown as $\beta$ is varied from 0° to 15°. The center of a notch is selected to be $\alpha = 67.5°$ which is conveniently chosen to be ⅜ of a full-period cycle in 22.5° or one-eighth cycle increments. A nearly linear control function 86 for the control of the fundamental versus notching pulse width is accomplished with minimized 11th or 13th harmonic content over the entire control range as seen for the normalized amplitude of the fundamental $M_1$.

Figure 5:
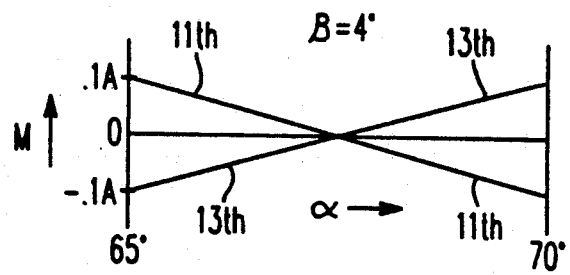
FIG. 5 shows a graph of 11th and 13th harmonic component representation for the notches of the waveform of FIG. 3, and shows where harmonics become minimized for the fundamental frequency as a function of a phase variable $\alpha$ when the notch-phase interval $\beta$ remains at a set value at 4°.
Figure 6B:
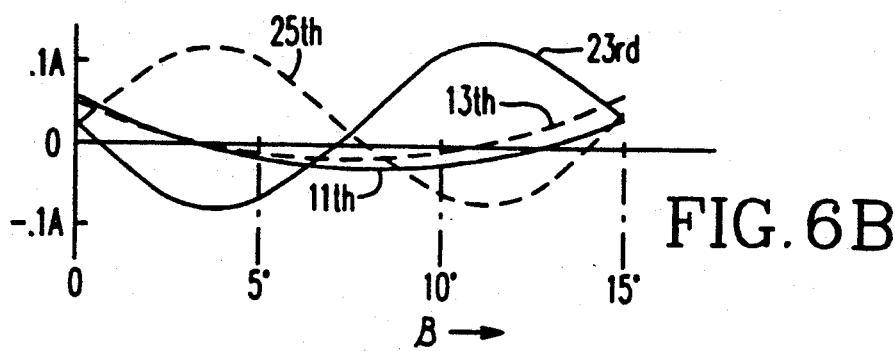
FIG. 6B shows a graph of low order harmonic components such as the 23rd and 25th relative to those harmonic components that were minimized in FIG. 5 by the optimized choice of notching variables.

Another revealing graph is shown in FIG. 6B which shows the low amplitude variation and compares the lower order harmonic components of minimized 11th and 13th harmonics in their relative relationship to polarized fluctuations of the 23rd and 25th harmonics plotted over the same range of notch-phase interval $\beta$ of 0° to 15°. This is also shown in terms of a normalized amplitude unit A on a condensed scale with the 23rd and 25th component harmonics which are of secondary importance because they contribute less to harmonic distortion, oscillating through zero for this choice of variables, at a value mid-way between $\beta = 5°$ to 10° or about 7.5°. The 11th and 13th harmonics are closest to zero on the scale at around 4° which is consistent with the selection that is shown in FIG. 5.

Figure 7:
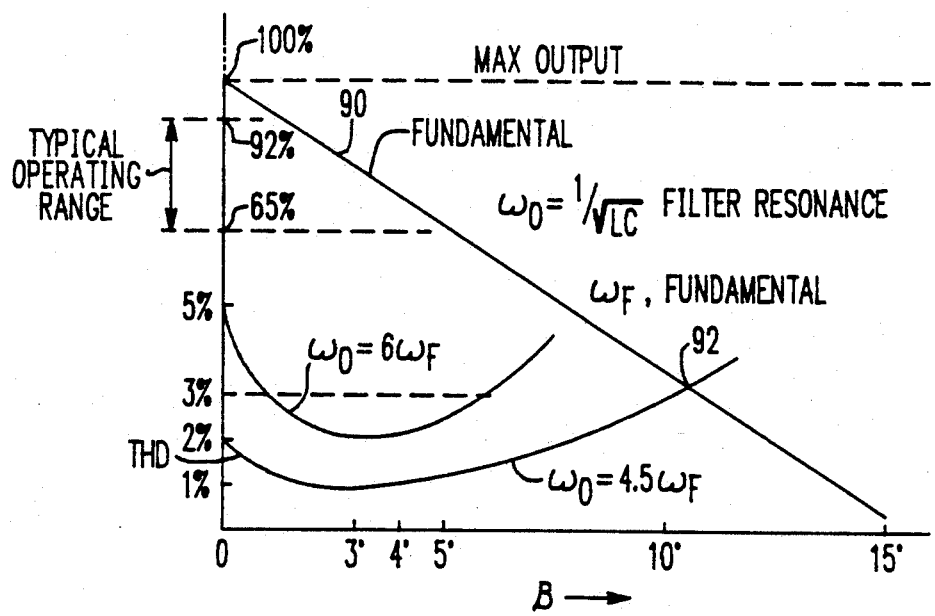
FIG. 7 shows a graph of relational filtered output harmonic component distortion which occurs near the middle of the operating range for a typical operating range function of notch-phase interval $\beta$.

The remaining harmonic component content is further reduced by filtering without inflating the filter requirements by using an inductor L and capacitor C in the embodiment of FIG. 4 which has the characteristics shown in FIG. 7. This set of curves is also true for the filter requirements of the remaining embodiments shown in FIGS. 8 and 9 in order to derive the full benefit of weight saving through harmonic neutralization with inverters incorporating the present invention for fundamental component voltage control.

The method of fundamental component voltage control with the circuit configuration of FIG. 4, incorporating the first and second neutralizing transformer wye and delta paired configuration, neutralizes the harmonics remaining in the harmonic spectrum such as those shown in the first incorporated U.S. application for patent entitled "Static Inverter". This first incorporated U.S. application illustrates that quasi harmonic neutralization leaves some residual harmonic components such as for the 11th and 13th harmonics, which would be absent in the output of a properly neutralized 24-pulse inverter or likewise would need to be eliminated in a 12-pulse inverter which the first incorporated U.S. application also mentions. The technique of using a leading and trailing edge notched rectangular pulse, with half-wave periodic strategic placement of time-paired notching sets for the reversal of the pole voltage, does not extend to the specific central zone notching requirements for controlled fundamental component and harmonic neutralization. Proportionate weight savings are realized for the new and improved three-phase inverter which accomplishes significantly improved results in eliminating the harmonics comparable to the showing in FIG. 13c in the first incorporated U.S. application. Reliance on the notching-pulse parameters defined in FIG. 13a of the first incorporated U.S. application results in a line-to-line voltage shown in FIG. 13b for the 24-pulse inverter of FIG. 10 therein which serves no purpose for the present control strategy.

It is envisioned that the present method and apparatus which were developed principally for a six-pulse inverter is unique for its centralized notching with respect to quarter-period phase segments in order to provide an apparent harmonic neutralization similar to the last-referred 24-pulse harmonic neutralization result in the first incorporated U.S. application but instead over an entire control range. The comparison in the achievement weighs less heavily in an inverse proportion to the number of poles so as to magnify the advantages which are inherent in the present invention which has hit the right zoning spot of limited multiple zoning spots. The greater number of pulses in the 12-pulse configuration provide at least twice as many poles and that means at least four times as many places where certain harmonics can be eliminated. The inversely proportional extension proceeds logically to a 24-pulse configuration, although the achievement for a particular purpose still has significance in a complex state of the art.

The analysis of FIG. 11 shows a graph of the relative magnitudes of the 11th and 13th harmonic components as a function of phase angle interval position $\alpha$ for various magnitudes of notch-phase interval $\beta$, according to the equation.

$$M_n = \frac{2A}{n\pi} [1 - 4(\sin(n\alpha)\sin(n\beta))] \quad (13)$$

This function is generic to the five-pulse notched rectangular waveform in FIG. 3 and has been used to isolate graphically the conjunctive zones in a quarter-period wave portion of the 11th and 13th harmonics. Equation (13) defines the curves in terms of component magnitudes as a function of phase angle interval $\alpha$ for notch-phase interval constants of $\beta=2°$ and $\beta=10°$. There are three possible zones of minimization for these harmonics in the range of discrete $\beta$ values which are discernable: that between $\alpha=35°$ to 40°; that chosen to be the minimized harmonic component selection with $\alpha$ from 65° to 69°; and, a narrow range from 82° to 84° with higher harmonic component values.

Another relational graph reflective of filtered output harmonic component operating plural curve functions is shown in FIG. 7 which graphs the fundamental component output characteristic 90 as a function of $\beta$. The center of the notch-phase interval $\beta$ ranges from $\beta=0°$ to 15°, and it has been selected at a phase angle interval $\alpha=67.5°$. This shows that with the position of the notch-phase interval $\beta$ being varied throughout this range, the maximum output component fundamental amplitude 90 will decrease from a maximum output at $\beta=0°$ to near a zero value at $\beta=15°$, with a typical operating range at 92 being ⅔ of the maximum voltage fundamental that can be obtained as a marking point. The angular frequency $\omega_0=1/\sqrt{LC}$ is a familiar equation for the inductor-capacitor filter resonance characteristic with the angular frequency and $\omega_F$ defining the fundamental angular frequency in radians per second from the substitution $\omega_F=2\pi F_F$. This shows that the five-pulse wave provides a wide range of output voltage control with a simple L-C filter with minimum harmonic content occurring near the center of the operating range of $\beta$ from about $\beta=1.5°$ to about $\beta=5.5°$. This also shows that there is less than 3% total harmonic distortion within this control range for $\omega_0=6\omega_F$. The lower curve designated THD with $\omega_0=4.5\omega_F$ shows the harmonic distortion for this filtering arrangement which is normally used on a VSCF system; there is less than 3% total harmonic distortion over the entire control range as presented in this curve for which the % scale is relevant.

Figure 8:
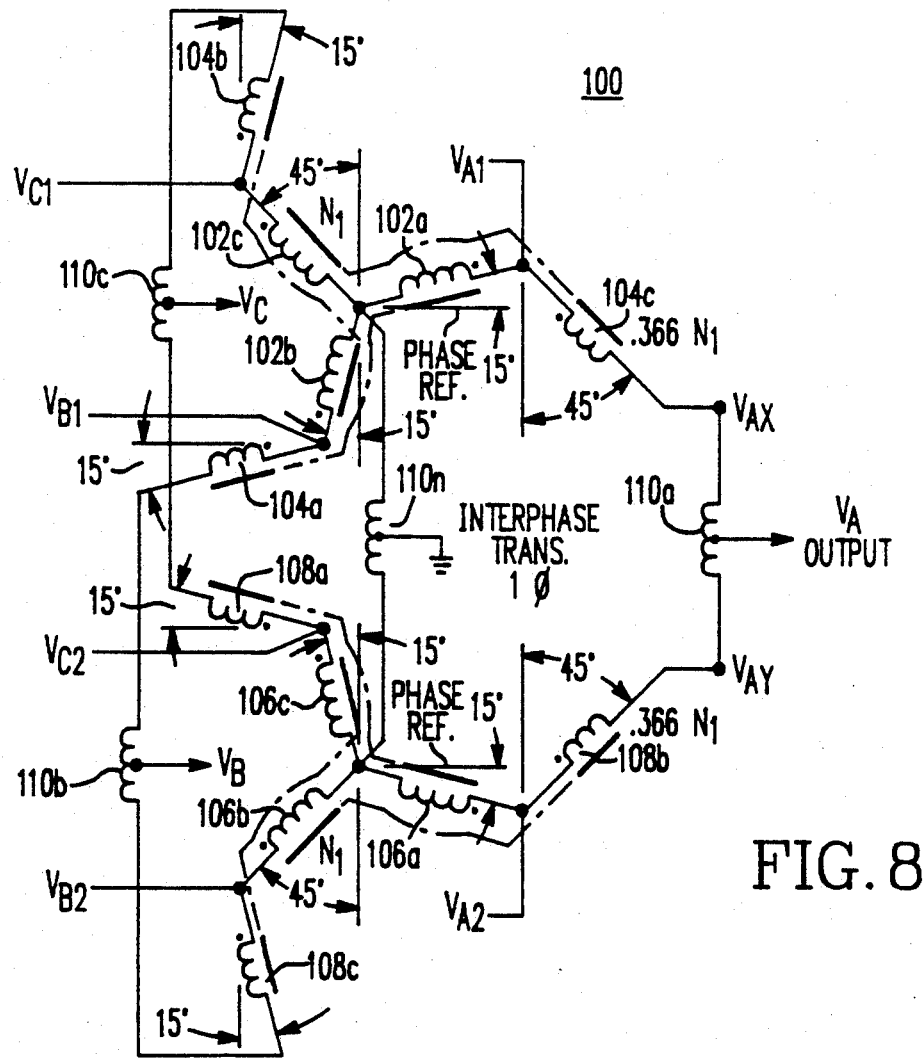
FIG. 8 shows a schematic circuit diagram of a wye with another wye paired transformer configuration in which interphase windings are non-associatively connected with harmonically neutralizing primary transformer winding phases, and an output circuit is formed through separate interphase auto-transformer windings forming respective phase loops through the interphase windings and primary winding connections.

There are alternate transformer configurations for the first and second neutralizing transformers other than the wye and delta paired transformers 70, 72 in FIG. 4 which likewise have been analyzed in a comparable manner with the above description. FIG. 8 presents a schematic circuit diagram of one of these alternative arrangements, useful with a floating DC supply which requires no isolation, and includes a wye with another wye harmonic neutralizing transformer in a paired loop configuration 100 which could be used with the rectangular notched pole generating portion of FIG. 4. This portion includes the first and second six-pulse inverter circuits 52, 54 along with the firing and logic control circuit 56 which provides the pole voltage waveform sets $A_1$, $B_1$, $C_1$ and $A_2$, $B_2$, $C_2$ as previously defined. A first closed wye connected input transformer includes windings 102a, 102b, 102c and the input voltages $V_{A1}$, $V_{B1}$, $V_{C1}$ are connected to an input terminal at each of these windings. These input terminals also serve to make connections to interphase windings, which have $1/(1+\sqrt{3})=0.366$ time $N_1$ or a fraction of the number of main winding turns, and these are designated respectively 104c, 104a, 104b which are wound on the same core as the main winding which the letter of the alphabet designates, namely that for 102a, 102b, 102c. This interphase winding coupled with a main phase winding on the same core is not to be confused with an interphase transformer which is a device used to hold off voltage differences while dividing current paths. The dashed line between related core winding pairs indicates that they are connected displaced from the main winding via a 120° relationship.

There is an advance phase rotation of 15° of the waveform input for the reference phase position of the main winding 102a which is to be compared with a phase delay of −15° of the waveform input for the reference phase position which occurs in a second closed wye connected input transformer phase winding 106a. The summation designates that a 30° phase lag of all phasors is intended between the respective phasors of the input transformers 102a and 106a phases. The other phases of the second closed wye connected input transformer 106b, 106c are likewise phase displaced by 30° from the corresponding phases of 102b and 102c. The remaining angles shown with respect to vertical and horizontal reference lines are either 15° or 45° which are used for the purpose of lining up the normal phase winding characterization for phase windings with phasor voltages displaced by 120° between each phase in each transformer set in order to provide the proper perspective. This drawing representation may be viewed to demonstrate that the angles are as inherently known for three-phase symmetrical wye paired transformers with phase displaced interphase winding connections configuration.

The second pole voltage set of notched rectangular waveforms from the second six-pulse bridge inverter circuit 54 in FIG. 4 provides the input voltage waveforms $V_{A2}$, $V_{B2}$, $V_{C2}$ at the terminals for each of the phase windings 106a, 106b, 106c which are also connected to the respective interphase windings 108b, 108c, 108a. These interphase windings are associated with the alphabetical main phase windings 106a, 106b, 106c, and they are shown with the same core as indicated by the dashed line between related core winding pairs to represent the associated windings. The transformer connections discussed above can take the form of single phase transformers with two windings on each core such as a main and an interphase winding, or otherwise, the transformer can be a three-phase winding set with each phase having a main winding and an interphase winding on the same core. The same can be the construction for each of the auto-transformers, next to be described, which interconnect the interphase winding sets for the three phases described above for each of the first and second closed-wye connected transformers.

A first phase auto-transformer 110a is connected across terminals $V_{Ax}$ to $V_{Ay}$ which are respectively connected to the interphase windings 104c and 108b in order to provide the resultant fundamental phase output voltage from the auto-transformer 110a which is sent to a L-C filter circuit similar to that shown in FIG. 4. Likewise an auto-transformer 110b is connected across interphase windings 104a and 108c in order to provide the resultant fundamental phase output voltage $V_B$ which is likewise filtered, and phase C auto-transformer 110c is connected across interphase windings 104b and 108a in order to provide the output phase voltage $V_C$ likewise to be filtered. Another auto-transformer 110n is connected between the neutral points of the pair of closed-wye connected three-phase transformers in order to serve as the neutral auto-transformer connection. Four single-phase auto-transformers 110a through 110n can be used to implement this arrangement or one three-phase auto-transformer with a neutral single-phase auto-transformer can also provide the proper implementation of same. The wye with another wye paired configuration achieves the resultant composite fundamental waveform by operating in parallel transformer configurations with the cancelled and reduced to a minimum harmonic content realizable from the notched pole voltage waveforms of five-pulse configuration.

Figure 10A:
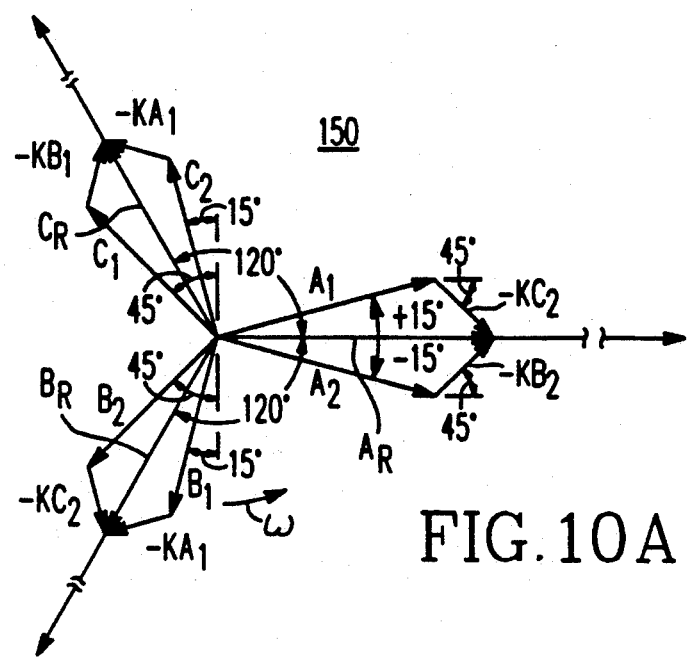
FIGS. 10A, B, C show graphic phasor addition of the fundamental, 5th and 7th harmonic voltage phasor components, the latter two of which are eliminated for paired harmonic neutralizing transformers with and without connected interphase windings according to the present invention.

The parameters previously described for the notch-phase interval $\beta$ control of the fundamental voltage and the optimized phase angle interval $\alpha$ can be further characterized with reference to the graph of FIG. 10A for the fundamental component phasor addition which occurs for the phase voltage $A_1$ which is vectorially supplemented with the vector addition of $-KC_2$. Phasor $A_2$ is supplemented by the vector addition of phasor $-KB_2$, where K is the winding ratio constant of $1/(1+\sqrt{3})$ as a coefficient of the interphase winding contributions to the vector addition for the rotating voltage phasor for the main winding components. A resultant phasor $A_R$ which rotates 1 counterclockwise at the angular velocity $\omega$ is associated with phase A and, likewise, a resultant phasor $B_R$ which is 120° phase delayed for phase B, and resultant phasor $C_R$ likewise 120° phase delayed for phase C constitutes the complete phasor set. This resultant phasor set is for the fundamental component phasors of the three-phase set which rotate with angular velocity $\omega$ so as to trace out the sinusoidal fundamental phase components realized electrically from the above.

Figure 10B:
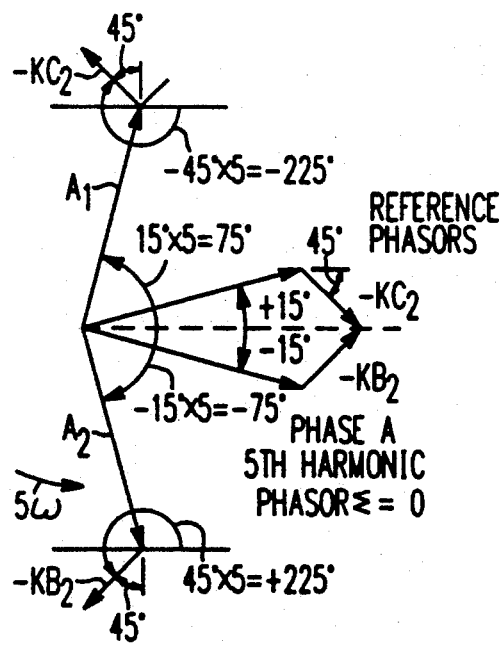

Regarding FIG. 10B which is a representation of harmonic components for the 5th harmonic of only phase A, it can be seen that the 5th harmonic phasors rotate according to the associated phase angle for each of the main and interphase phasors. A phase factor of five times the initial phase angle reference is $+/-75°$ in the case of the main phasors $A_1$, $A_2$. The polarized directions and multiple of five likewise applies to the rotation of the interphase phasors $-KC_2$ and $-KB_2$ in the amount of respective $-/+225°$ from the reference with the affect of vectorially cancelling the resultant 5th harmonic phasors so that the resultant phasor contributes no harmonic component or one only of zero magnitude. This checks graphically when all the main phasors and interphase phasors are appropriately constructed to length as exemplary indicated by the relative length sets of main phasors $A_1$, $A_2$ and interphase phasors $KC_2$, $KB_2$.

Figure 10C:
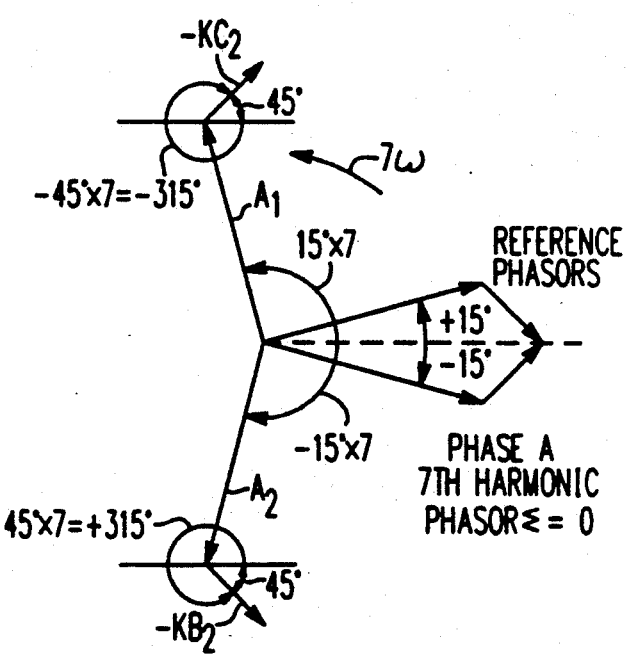

Another harmonic phasor analysis for phase A is shown in FIG. 10C using the same principle of phasor rotation of harmonic components with a factor of seven times the initial phase angle associated with the main and interphase phasors $-KC_2$ and $-KB_2$ for the 7th harmonic. The respective phase rotations are $+/-105°$ for the main phasors $A_1$, $A_2$ and $-/+315°$ for the interphase phasors. The net result of the vector phasor addition provides a resultant phasor which contributes no harmonic component or which cancels to zero when phasor component magnitudes are graphically represented to length rather than exemplary as here presented.

Figure 9:
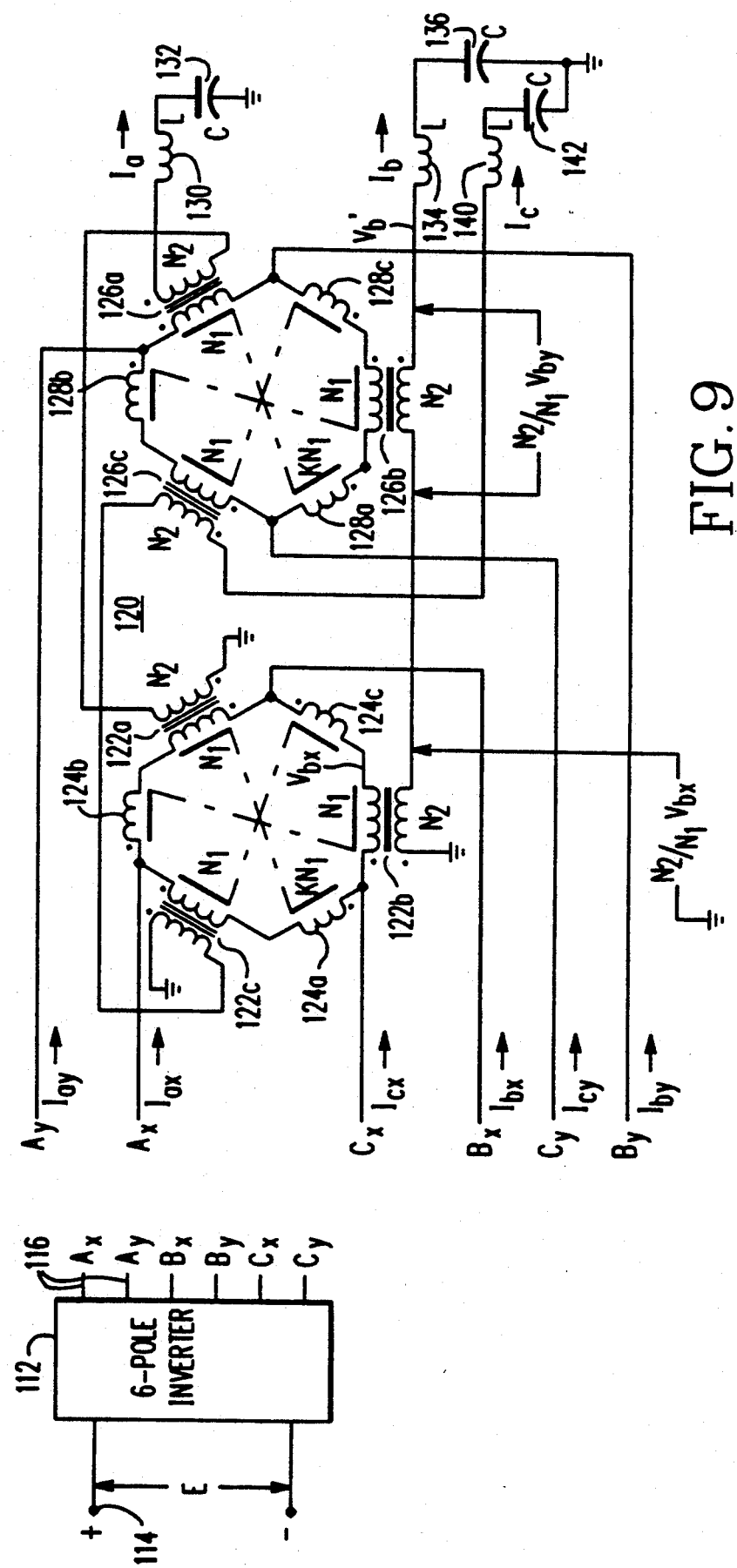
FIG. 9 shows a circuit schematic of a delta with another delta paired transformer configuration with a non-associatively connected interphase winding of each primary phase winding, interconnected between the primary windings of the alternate phases of a three-phase set, and an output circuit is formed through interconnecting series opposing pairs of secondary phase windings with each of same coupled to a phase associated primary phase winding from the respective neutralizing transformers.

Another alternate transformer configuration for the first and second neutralizing transformers is shown in the FIG. 9 embodiment which achieves harmonic neutralization of the type described above repeatedly, by instead using a delta with another delta paired transformer configuration 120 which is connected to a six-pole inverter 112. The inverter 112 is for converting to AC output from a DC input voltage E, connected at terminals 114 having a set of rectangular notched pole voltage outputs 116 designated $A_x$, $A_y$, $B_x$, $B_y$, $C_x$, $C_y$, and connected as designated to provide the harmonically neutralized phase output current $I_a$, $I_b$, $I_c$ with similar effect as previously described for the fundamental component control concept. The respective line currents $I_{ay}$, $I_{ax}$, $I_{cx}$, $I_{bx}$, $I_{cy}$, $I_{by}$, are assumed to flow toward the transformer nodes or junctions of the respective winding connections for the two delta paired harmonic neutralizing transformers 120.

This is not a standard delta winding connection for the transformers 120, since the first transformer configuration includes first main branch winding delta leg transformers 122a, 122b, 122c each having a respectively associated interphase winding 124a, 124b, 124c wound on the same core and connected across from it to form a junction with a phase displaced main winding branch of another delta leg transformer. The interphase winding 124a is connected between the main branch first winding legs 122b and 122c, while the interphase winding 124b, wound on the same core as main winding delta leg transformer 122b, is connected between main delta transformer windings 122a and 122c, and the remaining interphase transformer winding 124c is connected between the main delta winding transformers 122a and 122b. This arrangement is technically termed a truncated delta winding arrangement, and the output transformer windings of main branches for the delta leg transformers 122a, 122b, 122c combines with a respective 30° phase displaced second delta winding set.

The second non-standard delta winding connection transformer 120 is similar to the first truncated delta winding connection transformer configuration in that it includes first main branch winding delta leg transformers 126a, 126b, 126c each having a respectively associated interphase winding 128a, 128b, 128c wound on the same core. The main branch windings are connected across from the associated interphase winding to form a junction with a phase displaced main winding branch of another delta leg transformer. The interphase winding 128a is connected between the main branch first winding legs 126b and 126c, while the interphase winding 128b is connected between main delta transformer windings 126a and 126c, and the remaining interphase transformer winding 128c is connected between the main delta winding transformers 126a and 126b. The main windings and interphase windings for each of the truncated delta winding transformers are symbolically represented by associated dashed lines between a core line for the winding pairs which serves to suggest the relationship.

The respective phasor or vectorial summations for the windings of the truncated delta transformers likewise can be represented in a similar harmonic neutralization analysis of harmonic components by the technique rendered in FIGS. 10B and 10C for the alternate transformer configuration described with respect to the wye with another wye paired transformer configuration shown in FIG. 8. The factor K is a winding constant ratio effect on the interphase windings where $K = 1/(1+\sqrt{3}) = 0.366$ which serves as a multiplier constant of the number of pg,37 turns in the main delta primary winding leg or $KN_1$. This is used in a phasor analysis by vector addition which is more complicated for the truncated delta arrangement, although it proceeds in the same manner for the fundamental component as previously described with respect to FIG. 10A.

Still referring to FIG. 9, an output circuit is formed through an interconnecting series opposing pair of secondary windings $N_2$ associated respectively with each of the main branch for phase B winding delta leg transformers 122b and 126b. This series opposing pair of windings is connected in a series circuit with a filter inductive component 134 and a filter capacitor component 136 across the output in order to provide a path for the flow of phase output current $I_b$. The fundamental component of $I_b$ remains after harmonic neutralization and L-C filtering, according to the invention as previously described. The ratio of secondary winding turns $N_2$ to primary winding turns $N_1$ for the main branch winding delta leg transformer 122b provides a voltage across the secondary winding of 122b defined by $N_2/N_1 \cdot V_{bx}$ with respect to ground or neutral, and the voltage developed across the output winding coupled to the main branch delta leg transformer 126c is expressed by the relationship $N_2/N_1 \cdot V_{by}$. The polarity for $V_{by}$ is opposite to the previous mentioned portion of the composite output voltage contributed by $V_{bx}$ as based from the opposite winding sense coupling, with a resultant output current $I_b$ assumed to flow in the direction towards the LC filter to ground. The predominant voltage potential developed by these two main delta secondary winding leg component voltages establishes the actual direction of current flow.

The symmetry of the paired truncated delta harmonic neutralizing transformers 120 provides a symmetrically balanced phase output current $I_a$ which is developed in the same way across the associated main branch winding delta leg transformers 122a and 126a, and the $I_a$ is filtered through component inductor 130 and capacitor 132 output filter. The same symmetry is true for the phase output current $I_c$ and the filtering effect of inductor component 140 and capacitor component 142 which are selected to filter the 11th and 13th harmonic component values remaining after harmonic neutralization. The exception is that all the even harmonics are eliminated by the symmetry associated with the rectangular pole voltage waveform because of related symmetry.

The resultant output fundamental component, it turns out, is controllable by the notch-phase interval $\beta$ according to the invention, using the same parameters notched for the pole voltage waveforms of the five-pulse type shown in FIG. 3. This also shows that all harmonics present in a balanced set of input pole voltages for the delta with another delta or truncated delta transformer configuration are cancelled with the exception of the fundamental which is controlled by the notch-phase interval $\beta$, and the harmonic components that are immediately next adjacent in whole number multiples to twelve times the fundamental frequency are eliminated, while odd number multiples of six times the fundamental frequency are cancelled.

What is claimed is:

1. A multi-pole inverter method for a three-phase inverter system by providing switched or notched output voltages, wherein a step of controlling six-pulse circuits, includes switchably controlling the circuits by strategically notching or reducing the output pole voltage therefrom within the range for a centrally zoned or positioned half-wave pair of time controlled interval notches, with the notches becoming optimized in their variable placement with respect to preselected phase positions and variable pulse width or duration, reducing the harmonic content of the output voltage of the inverter circuit to a filterable minimum of harmonic voltage components of a frequency immediately next adjacent in whole number multiples of twelve time the fundamental frequency, and fundamental voltage controlling by pole switching, while cancelling odd number multiples next adjacent to six times the fundamental frequency, and the strategic notching step is set to controllably occur once during each one-quarter cycle for each pole voltage between 35° and 85°, as measured from a periodically occurring distinct polarity voltage level.

2. The inverter method of claim 1, wherein the strategic notching step is set to optimally occur once during each one-quarter cycle at about the mid-60° zone.

3. A multi-pole inverter method for a three-phase inverter system by providing switched or notched output voltages, wherein a step of controlling the six-pulse circuits includes switchably controlling the circuits by strategically notching or reducing the output pole voltage therefrom within the range for a centrally zoned or positioned half-wave pair of time controlled interval notches, including the step of centering the notches symmetrically on the optimized phase position about which the notching time-phase interval is initiated in advance of and terminated in like time thereafter, with the notches becoming optimized in their variable placement with respect to preselected phase positions and variable pulse width or duration, reducing the harmonic content of the output voltage of the inverter circuit to a filterable minimum of harmonic voltage components of a frequency immediately next adjacent in whole number multiples of twelve times the fundamental frequency, and fundamental voltage controlling by pole switching, while cancelling odd number multiples next adjacent to six times the fundamental frequency, including limiting a notch-phase interval duration within a range of about 2° to beyond 20°, within the respective quarter-cycle periodicity.

4. The inverter system of claim 3, wherein the notch-phase interval duration limited within the respective quarter-cycle periodicity is optimally set at about 10°.

5. A multi-phase inverter system operating from a source of DC input voltage to provide an AC output voltage which is harmonically neutralized over a predetermined controllable range while being controlled independently of the source voltage, said system comprising:

a multi-pole inverter circuit, connected across the DC input voltage, including at least a first and a second sixth-pulse bridge inverter circuit, each of said six-pulse circuits producing a separate set of phase displaced N-pole output voltages being switched 360/N° apart, said respective N-pole output voltages of said second six-pulse circuit each being phase delayed a portion of a periodic cycle with respect to the corresponding N-pole output voltages of said first six-pulse circuit, said six-pulse circuits including a switching control means for strategically notching or substantially reducing the output voltage within the range of a centrally located half-wave portion $(180° - 2\alpha)$ of each half-period pole voltage interval for a predetermined notching interval (2β) for the N-pole voltages of said first and second six-pulse bridge inverter circuits, said multi-pole inverter circuit being adapted to provide notched output voltages with the notches variable with respect to their preselected phase position and pulse width or duration;

a first neutralizing transformer including a connected set of windings disposed with each junction between windings being connected to a respective pole of the N-pole output voltages of said first six-pulse circuit;

a second neutralizing transformer including a connected set of windings disposed with each winding being connected to a respective pole of the N-pole output voltages of said second six-pulse circuit;

an output circuit including a composite transformer circuit coupled to said first and second neutralizing transformer windings, said output circuit including additive transformer connected windings for a phase, with a phase winding of said first neutralizing transformer being coupled to a respective leg of said connected winding, and a phase additive winding for said composite transformer circuit being coupled to a respective phase leg of a connected winding of said second neutralizing transformer, so that controlled notching of said multi-pole inverter circuit reduces the harmonic content of said inverter circuit to a filterable minimum of harmonic voltages immediately next adjacent to twelve times the fundamental frequency;

said output circuit providing through relative phase shifts a harmonically neutralized set of output voltages of a waveform for which all remaining harmonics immediately adjacent to odd number n multiples of 6(n6) of the fundamental frequency being cancelled, with the poles being switchable to control the fundamental voltage while substantially decreasing the 11th and 13th harmonics normally present in an unnotched square wave wherein said switching control means sets the strategic notching to controllably occur during each one-quarter cycle of N-pole voltages between 35° and 85°, as measured from a periodically occurring distinct polarity voltage level.

6. The multi-phase inverter system according to claim 5, wherein said switching control means sets the strategic notching to controllably occur during each half cycle of N-pole voltages and centered for each controlled notch interval (2β) at substantially 67.5° and 112.5°, respectively.

7. A multi-pole inverter apparatus for a multi-phase inverter system including an output circuit, constituting a transformer coupled closed-wye secondary composite circuit with terminals at which the harmonically neutralized fundamental output voltages are measurable, said output circuit including a composite transformer circuit which combines additive transformer windings for each phase, said additive windings being connected or coupled, depending upon the particular paired transformer configuration and depending upon the interphase transformer windings being in said rotated wye or truncated delta type of configuration, said multi-phase inverter system being adapted to provide switched or notched output voltages with the notches becoming optimized in their variable placement with respect to preselected phase positions and variable pulse width or duration, thereby to reduce the harmonic content of the output voltage of the inverter circuit to a filterable minimum of harmonic voltage components of a frequency immediately next adjacent in whole number multiples of twelve times the fundamental frequency, which is voltage controlled by pole switching, while odd number multiples next adjacent to components six times the fundamental frequency are cancelled, said secondary composite circuit includes an interphase auto-transformer with multiple interphase windings connected to the primary windings of the paired neutralizing transformers and an additional interphase auto-transformer connected between respective closed-wye neutral connections thereof.

8. A multi-pole inverter apparatus for a multi-phase inverter system including an output circuit, with terminals at which the harmonically neutralized fundamental output voltages are measurable, said output circuit includes a composite transformer circuit which combines additive transformer windings for each phase, said additive windings being connected or coupled, depending upon the particular paired transformer configuration and depending upon the interphase transformer windings being in said rotated wye or truncated delta type of configuration, said multi-phase inverter system being adapted to provide switched or notched output voltages with the notches becoming optimized in their variable placement with respect to preselected phase positions and variable pulse width or duration, thereby to reduce the harmonic content of the output voltage of the inverter circuit to a filterable minimum of harmonic voltage components of a frequency immediately next adjacent in whole number multiples of twelve times the fundamental frequency, which is voltage controlled by pole switching, while odd number multiples next adjacent to components six times the fundamental frequency are cancelled, said truncated delta transformer composite output circuit include serial opposing sense pairs of associated secondary windings in series with each other, each said respective opposing secondary winding is coupled to a similarly sensed respective phase primary winding of the associated neutralizing transformer.

9. The inverter of claim 8, wherein said centrally zoned notches being symmetrically centered on the optimized phase position about which the notching time-phase interval is initiated in advance of and terminated in like time thereafter.

10. A multi-phase inverter system operating from a source of DC input voltage to provide an AC output voltage which is harmonically neutralized over a predetermined controllable range while being controlled independently of the source voltage, said system comprising:

a multi-pole inverter circuit, connected across the DC input voltage, including at least a first and a second six-pulse bridge inverter circuit, each of said six-pulse circuits producing a separate set of phase displaced N-pole output voltages being switched 360/N° apart, said respective N-pole output voltages of said second six-pulse circuit each being phase delayed a portion of a periodic cycle with respect to the corresponding N-pole output voltages of said first six-pulse circuit, said six-pulse circuits including a switching control means for strategically notching or substantially reducing the output voltage within the range of a centrally located half-wave portion (180°−2α) of each half-period pole voltage interval for a predetermined notching interval (2β) for N-pole voltages of said first and second six-pulse bridge inverter circuits, said multi-pole inverter circuit being adapted to provide notched output voltages with the notches variable with respect to their preselected phase position and pulse width or duration;

a first neutralizing transformer including a connected set of windings disposed with each junction between windings being connected to a respective pole of the N-pole output voltages of said first six-pulse circuit;

a second neutralizing transformer including a connected set of windings disposed with each winding being connected to a respective pole of the N-pole output voltages of said second six-pulse circuit;

an output circuit including a composite transformer circuit coupled to said first and second neutralizing transformer windings, said output circuit including additive transformer connected windings for a phase, with a phase winding of said first neutralizing transformer being coupled to a respective leg of said connected winding, and a phase additive winding for said composite transformer circuit being coupled to a respective phase leg of a connected winding of said second neutralizing transformer, so that controlled notching of said multi-pole inverter circuit reduces the harmonic content of said inverter circuit to a filterable minimum of harmonic voltages immediately next adjacent to twelve times the fundamental frequency;

said output circuit providing through relative phase shifts a harmonically neutralized set of output voltages of a waveform for which all remaining harmonics immediately adjacent to odd number n multiplies of 6(n6) of the fundamental frequency being cancelled, with the poles being switchable to control the fundamental voltage while substantially decreasing the 11th and 13th harmonics normally present in an unnotched square wave, said switching control means sets the strategic notching to controllably occur during each one-quarter cycle of N-pole voltages and centered at substantially 67.5°, as measured from a periodically occurring distinct polarity voltage level, upon which center the notching interval is initiated within a range of approximately 3.5° prior thereto in order to remain within a symmetrically centered total range of substantially 7° before terminating the notching interval so that the 11th and 13th harmonics reduce substantially to zero.

11. A multi-pole inverter apparatus for a multi-phase inverter system which is adapted to provide switched or notched output voltages with the notches becoming optimized in their variable placement with respect to preselected phase positions and variable pulse width or duration, thereby to reduce the harmonic content of the output voltage of the inverter circuit to a filterable minimum of harmonic voltage components of a frequency immediately next adjacent in whole number multiples of twelve times the fundamental frequency, which is voltage controlled by pole switching, while odd number multiples next adjacent to components six times the fundamental frequency are cancelled, the notch interval duration being set within a range of about 2° to beyond 20°, within the respective quarter-cycle periodicity, so that the notches cause the 11th and 13th harmonics to reduce substantially to zero and the 23rd and 25th harmonics are substantially reduced towards zero.

12. The inverter of claim 11, wherein the notch interval duration being optimally set at about 10° within the respective quarter-cycle periodicity so the reduction in harmonics most favorably occurs.

13. A multi-pole inverter apparatus for a multi-phase inverter system which is adapted to provide switched or notched output voltages with the notches becoming optimized in their variable placement with respect to preselected phase positions and variable pulse width or duration, a pair of six-pulse bridge inverter circuits are used to provide separate sets of constantly phase displaced output voltages, each phase output voltage is also phase rotated or displaced 120° in a uniform intra-transformer constant phase displacement, and each pole output voltage is phase displaced a further predetermined amount of phase angle with respect to the output voltages of the individual phases of the respective bridge inverter circuits, thereby to reduce the harmonic content of the output voltage of the inverter circuit to a filterable minimum of harmonic voltage components of a frequency immediately next adjacent in whole number multiples of twelve times the fundamental frequency, which is voltage controlled by pole switching, while odd number multiplies next adjacent to components six times the fundamental frequency are cancelled, said six-pulse circuits are adapted to be switchably controlled by strategically notching or reducing the output pole voltage therefrom within the range for a centrally zoned or positioned half-wave pair of time controlled interval notches, said strategic notching being set to controllably occur during each one-quarter cycle for each pole voltage between 35° and 85°, as measured from a periodically occurring distinct polarity voltage level.

14. The inverter of claim 13, wherein said strategic notching being set to occur once during each one-quarter cycle for each pole voltage stated angular value range is optimally set at an angular value of about mid-60° as measured from a periodically occurring distinct polarity voltage level.

15. A multi-phase inverter system operating from a source of DC input voltage to provide an AC output voltage which is harmonically neutralized over a predetermined controllably range while being controlled independently of the source voltage, said system comprising:

a multi-pole inverter circuit, connected across the DC input voltage, including at least a first and a second six-pulse bridge inverter circuit, each of said six-pulse circuits producing a separate set of phase displaced N-pole output voltages being switched 360/N° apart, said respective N-pole output voltages of said second six-pulse circuit each being phase delayed a portion of a periodic cycle with respect to the corresponding N-pole output voltages of said first six-pulse circuit, said six-pulse circuits including a switching control means for strategically notching or substantially reducing the output voltage within the range of a centrally located half-wave portion (180°−2α) of each half-period pole voltage interval for a predetermined notching interval (2β) for the N-pole voltages of said first and second six-pulse bridge inverter circuits, said multi-pole inverter circuit being adapted to provide notched output voltages with the notches variable with respect to their preselected phase position and pulse width or duration;

a first neutralizing transformer including a connected set of windings disposed with each junction between windings being connected to a respective pole of the N-pole output voltages of said first six-pulse circuit;

a second neutralizing transformer including a connected set of windings disposed with each winding being connected to a respective pole of the N-pole output voltages of said second six-pulse circuit;

an output circuit including a composite transformer circuit coupled to said first and second neutralizing transformer windings, said output circuit including additive transformer connected windings for a phase, with a phase winding of said first neutralizing transformer being coupled to a respective leg of said connected winding, and a phase additive winding for said composite transformer circuit being coupled to a respective phase leg of a connected winding of said second neutralizing transformer, so that controlled notching of said multi-pole inverter circuit reduces the harmonic content of said inverter circuit to a filterable minimum of harmonic voltages immediately next adjacent to twelve times the fundamental frequency;

said output circuit providing through relative phase shifts a harmonically neutralized set of output voltages of a waveform for which all remaining harmonics immediately adjacent to odd number n multiplies of 6(n6) of the fundamental frequency being cancelled, with the poles being switchable to control the fundamental voltage while substantially decreasing the 11th and 13th harmonics normally present in an unnotched square wave, said switching control means sets the strategic notching to controllably occur during each half cycle of N-pole voltages at substantially 64° and 109°, respectively, as measured from a periodically occurring distinct polarity voltage level, upon which the notching interval is initiated for substantially 2° to beyond 20° at each of these occurrences before terminating so that the 11th and 13th harmonics reduce substantially towards zero.

16. A multi-pole inverter method for a three-phase inverter system by providing switched or notched output voltages, wherein at least one pair of neutralizing transformers receive the sets of output voltages from the inverter circuits across the primary windings which are connected in either a wye with a delta paired configuration, or a wye with another wye rotated paired configuration, or alternatively in a delta with another delta paired configuration, including the step of serially connecting, in either the rotated wye paired or delta with another delta paired winding configurations, transformer interphase windings with main transformer windings of a different phase, the delta paired configuration resulting in a type of transformer a truncated delta paired configuration, with the notches becoming optimized in their variable placement with respect to preselected phase positions and variable pulse width or duration, reducing the harmonic content of the output voltage of the inverter circuit to a filterable minimum of harmonic voltage components of a frequency immediately next adjacent in whole number multiples of twelve times the fundamental frequency, and fundamental voltage controlling by pole switching, while cancelling odd number multiples next adjacent to six times the fundamental frequency, wherein the step of serially connecting the output circuit includes connecting serial opposing sense pairs of associated secondary windings while coupling each respective opposing secondary winding to a similarly sensed respective phase primary winding of the associated neutralizing transformer.

17. The method of claim 16, wherein serially connecting the output circuit constituting either a transformer coupled to closed-wye secondary composite circuit or connecting interphase auto-transformers with multiple interphase windings to the primary windings of the paired neutralizing transformers, and connecting an additional interphase auto-transformer between respective closed-wye neutral connections thereof.

18. A multi-phase inverter circuit system operating from a source of DC input voltage to provide an AC output voltage which is harmonically neutralized over a predetermined controllable range while being controlled independently of the source voltage, said system comprising:

a multi-pole inverter circuit, connected across the DC input voltage, including at least a first and a second six-pulse bridge inverter circuit, each of said six-pulse circuits producing a separate set of phase displaced N-pole output voltages being switched 360/N° apart, said respective N-pole output voltages of said second six-pulse circuit each being phase delayed a portion of a periodic cycle with respect to the corresponding N-pole output voltages of said first six-pulse circuit said six-pulse circuits including a switching control means for strategically notching or substantially reducing the output voltage within the range of a centrally located half-wave portion $(180° - 2\alpha)$ of each half-period pole voltage interval for a predetermined notching interval $(2\beta)$ for the N-pole voltages of said first and second six-pulse bridge inverter circuits, said multi-pole inverter circuit being adapted to provide notched output voltages with the notches variable with respect to their preselected phase position and pulse width or duration;

a first neutralizing transformer including a connected set of windings disposed with each junction between windings being connected to a respective pole of the N-pole output voltages of said first six-pulse circuit;

a second neutralizing transformer including a connected set of windings disposed with each winding being connected to a respective pole of the N-pole output voltages of said second six-pulse circuit;

an output circuit including a composite transformer circuit coupled to said first and second neutralizing transformer windings, said output circuit including additive transformer connected windings for a phase, with a phase winding of said first neutralizing transformer being coupled to a respective leg of said connected winding, and a phase additive winding for said composite transformer circuit being coupled to a respective phase leg of a connected winding of said second neutralizing transformer, so that controlled notching of said multi-pole inverter circuit reduces the harmonic content of said inverter circuit to a filterable minimum of harmonic voltages immediately next adjacent to twelve times the fundamental frequency;

said output circuit providing through relative phase shifts a harmonically neutralized set of output voltages of a waveform for which all remaining harmonics immediately adjacent to odd number n multiplies of 6(n6) of the fundamental frequency being cancelled, with the poles being switchable to control the fundamental voltage while substantially decreasing the 11th and 13th harmonics normally present in an unnotched square wave, wherein said switching control means sets the strategic notching to controllably occur during each half cycle of N-pole voltages and centered at substantially 67.5°, as measured from each end of a periodically occurring distinct polarity voltage level, upon which center the notching interval is initiated within a range of approximately 10° prior thereto in order to remain within a symmetrically centered range for substantially 10° more to a total of 20° before terminating so that the 11th and 13th harmonics reduce substantially to zero and the 23rd and 25th harmonics are substantially reduced towards zero.

19. A multi-phase inverter system operating from a source of DC input voltage to provide an AC output voltage which is harmonically neutralized over a predetermined controllable range while being controlled independently of the source voltage, said system comprising:

a multi-pole inverter circuit, connected across the DC input voltage, including at least a first and a second six-pulse bridge inverter circuit, each of said six-pulse circuits producing a separate set of phase displaced N-pole output voltages being switched 360/N° apart, said respective N-pole output voltages of said second six-pulse circuit each being phase delayed a portion of a periodic cycle with respect to the corresponding N-pole output voltages of said first six-pulse circuit, said six-pulse circuits including a switching control means for strategically notching or substantially reducing the output voltage within the range of a centrally located half-wave portion (180°−2α) of each half-period pole voltage interval for a predetermined notching interval (2β) for the N-pole voltages of said first and second six-pulse bridge inverter circuits, said multi-pole inverter circuit being adapted to provide notched output voltages with the notches variable with respect to their preselected phase position and pulse width or duration;

a first neutralizing transformer including a connected set of windings disposed with each junction between windings being connected to a respective pole of the N-pole output voltages of said first six-pulse circuit;

a second neutralizing transformer including a connected set of windings disposed with each winding being connected to a respective pole of the N-pole output voltages of said second six-pulse circuit;

an output circuit including a composite transformer circuit coupled to said first and second neutralizing transformer windings, said output circuit including additive transformer connected windings for a phase, with a phase winding of said first neutralizing transformer being coupled to a respective leg of said connected winding, and a phase additive winding for said composite transformer circuit being coupled to a respective phase leg of a connected winding of said second neutralizing transformer, so that controlled notching of said multi-pole inverter circuit reduces the harmonic content of said inverter circuit to a filterable minimum of harmonic voltages immediately next adjacent to twelve times the fundamental frequency;

said output circuit providing through relative phase shifts a harmonically neutralized set of output voltages of a waveform for which all remaining harmonics immediately adjacent to odd number n multiples of 6(n6) of the fundamental frequency being cancelled, with the poles being switchable to control the fundamental voltage while substantially decreasing the 11th and 13th harmonics normally present in an unnotched square wave, wherein said switching control means sets the strategic notching to controllably occur during each one-quarter cycle of N-pole voltages substantially at 57° or 66° and 102° or 111° for the first half-period, respectively, as measured from a periodically occurring distinct polarity voltage level, upon which the notching interval is initiated for a respective duration of substantially 20° or 4° at each of these occurrences before terminating so that the 11th and 13th harmonics reduce substantially to zero and the 23rd and 25th harmonics are substantially reduced towards zero.

* * * * *